(12) United States Patent
Tsunoo

(10) Patent No.: US 6,504,929 B1
(45) Date of Patent: Jan. 7, 2003

(54) ENCRYPTION STRENGTH EVALUATION SUPPORT APPARATUS AND RECORDING MEDIUM RECORDING ENCRYPTION STRENGTH EVALUATION SUPPORT PROGRAM

(75) Inventor: Yukiyasu Tsunoo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/236,640

(22) Filed: Jan. 26, 1999

(30) Foreign Application Priority Data

Jan. 27, 1998 (JP) .......................... 10-029132

(51) Int. Cl.[7] .............................. H04L 9/28; G06F 9/00
(52) U.S. Cl. .................. 380/28; 380/1; 380/2
(58) Field of Search .................. 380/102, 28, 52, 380/30

(56) References Cited

U.S. PATENT DOCUMENTS

| | | | |
|---|---|---|---|
| 5,307,807 A | * 5/1994 | Sosa et al. | 600/409 |
| 5,430,833 A | * 7/1995 | Terenghi | 345/440 |
| 5,465,258 A | * 11/1995 | Adams | 717/128 |
| 5,544,255 A | 8/1996 | Smithies et al. | |
| 5,647,017 A | 7/1997 | Smithies et al. | |
| 5,715,164 A | * 2/1998 | Liechti et al. | 705/410 |
| 5,806,059 A | * 9/1998 | Tsuchida et al. | 707/2 |
| 5,838,795 A | * 11/1998 | Mittenthal | 380/28 |
| 5,893,069 A | * 4/1999 | White, Jr. | 705/1 |
| 5,903,730 A | * 5/1999 | Asai et al. | 709/224 |
| 6,088,676 A | * 7/2000 | White, Jr. | 705/1 |
| 6,108,419 A | * 8/2000 | LaMacchia et al. | 380/2 |

FOREIGN PATENT DOCUMENTS

| | | |
|---|---|---|
| JP | 8-190344 | 7/1996 |
| JP | 9-160489 | 6/1997 |
| WO | WO9743736 | 11/1997 |

OTHER PUBLICATIONS

Matsui "Des Encryption Linear Decoding Method (1)", The 1993 Symposium on Cryptography and Information Security, SCIS93–3C, Shuzenji, Japan, Jan. 1993.
*Encryption and Information Security*, "2.5 Ciphertext Randomness Evaluation Indices", Shokodo, Mar. 29, 1990, pp. 49–56.
Dawson, Statistical Techniques for Assessing Strength of Ciphers 1990, The institution of Engineers Australia, pp. 84–87.*
Beretsky, Microsoft'statistics program requires more effort for business forcasts 1984, PC Week vol. 1, No. 22, pp. 62–63.*

* cited by examiner

*Primary Examiner*—Gilberto Barrón
*Assistant Examiner*—Kambiz Zand
(74) *Attorney, Agent, or Firm*—Foley & Lardner

(57) ABSTRACT

An encryption strength evaluation support apparatus includes a statistical data sampling program executing means for statistically obtaining correlations between individual bits of input and output data of an encryption device to be evaluated, a statistical result storage means for storing the bit correlations obtained by the statistical data sampling program executing means, and a statistical result edit/output means for editing and outputting the bit correlations stored in the statistical result storage means in the form of a table or a two- or three-dimensional graph. A mechanically readable recording medium recording an encryption strength evaluation support program for the above apparatus is also disclosed.

17 Claims, 20 Drawing Sheets

FIG. 11

```
/* ENCRYPTION ALGORITHM SOURCE FILE */
/* EOR MASTERKEY AND TEXT TO FORM CIPHER (32bits/block) */
unsigned int masterkey;
void encript (unsigned int *test. unsigned int *cipher)
{
*cipher = *text ^ masterkey;
}
```

FIG. 12

```
*include <conio.h>

/* USER-DEFINED TYPE NAME */
typedef unsigned int uint;
typedef unsigned char uchar;

/* COMMON EXTERNAL FUNCTION */
void fkeyBlk(const uchar *);
void fDatBlk(const uchar *, uchar *);
extern void avalance(void);
extern void balance(void);
extern void iorelation(void);
extern void relation(void);

/* EXTERNAL VARIABLE DECLARATION */
uint dKeySeed = 9705150;  /* KEY RANDOM NUMBER SEED */
uint dDatSeed = 9705151;  /* INPUT DATA RANDOM NUMBER SEED */
uint dKeyBit = 32;  /* KEY BIT LENGTH */
uint dInBit = 32;   /* INPUT DATA BLOCK BIT LENGTH */
uint dOutBit = 32;  /* OUTPUT DATA BLOCK BIT LENGTH */
uint dKeyCnt = 6;   /* KEY CHANGE COUNT : CHANGE 2^(dKeyatCnt) TIMES */
uint dDatCnt = 17;  /* DATA CHANGE COUNT : CHANGE 2^(dDatCnt) TIMES FOR ONE KEY */
uint dKbCnt = 12;   /* KEYBOARD INPUT MONITORING INTERVAL =
                       MONITOR WHENEVER CALCULATION IS PERFORMED 2^(dKbCnt) TIMES */
uint dSavCnt = 31;  /* AUTOMATIC SAVE INTERVAL =
                       SAVE WHENEVER CALCULATION IS PERFORMED 2^(dSavCnt) TIMES */

/* EXTERNAL FUNCTION DECLARATION */
extern void encript(unsigned int *, unsigned int *);
extern int key;
```

FIG. 13

```
/**************
* main() STATISTICAL EVALUATION MAIN FUNCTION
**************/
void main(void)
{
/* CALL STATISTICAL EVALUATION FUNCTION */
avalanche( );/* EXECUTE AVALANCHE EVALUATION
ioreiation( );/* EXECUTE INPUT BIT-OUTPUT BIT RELATION EVALUATION
relation( );/* EXECUTE OUTPUT BIT RELATION EVALUATION
balance( );/* EXECUTE BALANCE EVALUATION
}

/******************
* fKeyBlk( ) RECEIVE AND PROCESS KEY
*****************/
void fKeyBlk(const uchar *inkey)
{
masterkey = inkey [0] <<24 | inkey [1] <<16 | inkey [2] <<8 | inkey [3] ;
}

/****************************
*  fDatBlk( ) RECEIVE DATA AND FORM EVALUATION OBJECT DATA
****************************/
void fDatBlk(const uchar *indat, uchar *outdat)
{
uint text, cipher; / * DEFINE INPUT/OUTPUT WORK VARIABLE */

/* COPY CONTENTS OF indat [ ] TO INPUT WORK VARIABLE */
text = Indat [0] <<24 | indat [1] <<16 | indat [2] <<8 | indat [3] ;

/* CALL EVALUATION OBJECT */
encript (&text, &cipher);

/* COPY OUTPUT RESULTS TO outdat [ ] */
outdat [0] = cipher>>24;
outdat [1] = cipher>>16;
outdat [2] = cipher>>8;
outdat [3] = cipher;
}
```

FIG. 14

```
B:¥Temp>encript
Avalanche(V4.0) test start! Fri Aug 08 14:46:28 1997
Avalanche(V4.0) Fri Aug 08 14:46:37 1997
count = 2^ 14.322(0.24%. 2276rps)···> [+1:01:17] Fri Aug 08 15:47:54 1997
SAVE: ava.sav RESULT: ava_last_xls
Input/Output bit Relation (V4.0) test start! Fri Aug 08 14:46:43 1997
                    :
                    :
                    :
                    :
                    :
                    .
                    :
B:¥Temp>encript
Avalanche(V4.0) test start! Fri Aug 08 14:47:40 1997
RESUME: ava. sav
                    :
                    :
                    :
```

FIG. 15

Key send = 9705100, Data seed = 9705101
All data count = 2^24 (2^4Key * 2^20Data)
Finished  1677216 = 2^24

|       | value     | xSD      | deviation  | width   |
|-------|-----------|----------|------------|---------|
| MEAN  | 141699.4  | 2^-13.775(| 50.4223   |         |
| MAX   | 16777216  | 6.448411 | 2^0        | 100     |
| MIN   | -1.7E+07  | -6.55826 | 2^0        | 0       |
| VAR   | 6.66E+12  |          |            |         |
| SD    | 2579785   |          |            |         |
| CONFIDENCE INTERVAL(95%) | | | | |
| -16309.3 | 299708.1 | | | |

1502

|   | 0        | 1     | 2        | 3    | 4        | 5        | 6        | 7     |
|---|----------|-------|----------|------|----------|----------|----------|-------|
| 0 | 10248    | 1360  | 4472     | 928  | 16777216 | 10512    | 408      |       |
| 1 | 1492     | -356  | 0        | 0    | -652     | 16777216 | -8512    |       |
| 2 | -4152    | -1232 | 24       | 5648 | -2640    | 14112    | 6108     |       |
| 3 | -1460    | 0     | 4208     | 1492 | -13136   | 0        | -172     |       |
| 4 | -2816    | -1252 | 6240     | -3720| -2328    | 1448     | 8184     |       |
| 5 | 16777216 | -108  | 1544     | -4640| -1232    | -668     | 3008     |       |
| 6 | 0        | 16777216 | 8616  |      | -3832    | 4208     | 0        |       |
| 7 |          |       |          |      |          |          |          |       |

1501

3D CONTOUR GRAPH (INVERTED) (②)

CONTOUR GRAPH (①)

LINE GRAPH (SERIES: ROW) (③)

LINE GRAPH (SERIES: ROW) (④)

ENCRYPTION STRENGTH EVALUATION SUPPORT APPARATUS AND RECORDING MEDIUM RECORDING ENCRYPTION STRENGTH EVALUATION SUPPORT PROGRAM

BACKGROUND OF THE INVENTION

1. Field of the Invention

The present invention relates to an encryption strength evaluation support apparatus suited to evaluating the encryption strength of encryption device by using a statistical method and a mechanically readable recording medium recording an encryption strength evaluation support program.

2. Description of the Prior Art

Conventional techniques of evaluating the strength of encryption algorithm are roughly classified into those based on a specific decoding method and those based on statistical methods.

Examples of the encryption strength evaluation based on a specific decoding method are "Method and Apparatus for Evaluating Strength of Encryption Algorithm" described in Japanese Unexamined Patent Publication No. 8-190344 and "Encryption Performance Evaluation Apparatus" described in Japanese Unexamined Patent Publication No. 9-160489 similar to the former patent. Either technique evaluates the strength of encryption algorithm in terms of strength against linear decoding for block encryption. That is, the former technique finds a linear approximate expression having a maximum deviation ratio obtainable from an encryption algorithm whose strength is to be evaluated. On the basis of the result of this search, the strength of encryption algorithm against linear decoding is evaluated. The latter technique attempts to improve the performance of evaluation by increasing linear correlation detection efficiency in linear decoding. Details of the linear decoding are described in Mitsuru Matsui ("DES Encryption Linear Decoding method (1)", SCIS93-3C (January, 1993).

On the other hand, the conventional encryption strength evaluation based on statistical methods is described in, e.g., "Encryption and Information; Security" (Mar. 29, 1990, Shokodo), "2.5 Ciphertext Randomness Evaluation Indices" (pp. 49–56). That is, this technique evaluates the encryption strength by using numerical values such as the maximum value, mean value, and variance of the correlation between input land output data. This reference also describes discrimination between the strengths of a plurality of encryption algorithms by comparing these numerical values.

The encryption strength evaluation based on a specific decoding method depends upon the specific decoding method called linear decoding. Therefore, this technique cannot evaluate in principle the strength of encryption algorithm to which this decoding method is not applicable, and hence lacks versatility. In contrast, the method of evaluating encryption strength by using a statistical method is highly versatile because the method does not depend upon any specific decoding method.

Unfortunately, the conventional encryption strength evaluation technique based on a statistical method evaluates encryption strength by using numerical values such as the maximum value, mean value, and variance of the correlation between input and output data. Since these values are representative values of a large number of sample values, this technique cannot finely analyze the behavior of encryption conversion. In some instances, evaluation errors may take place.

SUMMARY OF THE INVENTION

The present invention has been made in consideration of the above situation and has as its object to provide an encryption strength evaluation support apparatus capable of evaluating encryption strength independent of any specific decoding method and finely analyzing the behavior of encryption conversion, and a mechanically readable recording medium recording an encryption strength evaluation support program.

It is another object of the present invention to provide an encryption strength evaluation support apparatus capable of easily analyzing the behavior of encryption conversion, and a mechanically readable recording medium recording an encryption strength evaluation support program.

To achieve the above objects, according to the first aspect of the present invention, there is provided an encryption strength evaluation support apparatus comprising statistical data sampling program executing means for statistically obtaining correlations between individual bits of input and output data of an encryption device to be evaluated, statistical result storage means for storing the bit correlations obtained by the statistical data sampling program executing means, and statistical result edit/output means for editing and outputting the bit correlations stored in the statistical result storage means in the form of a table or a two- or three-dimensional graph.

In this encryption strength evaluation support apparatus, the statistical data sampling program executing means statistically obtains correlations between individual bits of input and output data of an encryption device to be evaluated and stores the bit correlations in the statistical result storage means. The statistical result edit/output means edits and outputs the bit correlations stored in the statistical result storage means in the form of a table of a two- or three-dimensional graph. Accordingly, it is possible to evaluate encryption strength independently of any specific decoding method and finely and easily analyze the behavior of encryption conversion.

According to the present invention, there is provided an encryption strength evaluation support apparatus further comprising, in addition to the arrangement of the first aspect, evaluation object program forming means for forming an encryption program to be evaluated, wherein the statistical data sampling program executing means statistically obtains correlations between individual bits of input and output data of the evaluation object program formed by the evaluation object program forming means. This allows a single apparatus to design and evaluate an encryption algorithm and thereby improves the efficiency of development.

According to the present invention, there is provided an encryption strength evaluation support apparatus further comprising statistical program library means for holding, for each predetermined evaluation item, a statistical program for calculating data necessary to evaluate the evaluation item, and evaluation object data group generating means having evaluation object program forming means for forming an encryption program to be evaluated, evaluation condition setting means for setting evaluation conditions, and interface function setting means for setting an interface between the evaluation object program formed by the evaluation object program forming means and the statistical programs, the evaluation object data group generating means holding an evaluation object data group including the formed evaluation object program and the set evaluation conditions and interface, wherein the statistical data sampling program executing means comprises statistical data sampling program generating/activating (restarting) means for generating a statistical data sampling program for statistically obtaining correlations between individual bits of input and output data of the evaluation object program from the evaluation object data group and the statistical programs in the statistical program library means. This allows a single apparatus to design an encryption algorithm and evaluate the algorithm by using the statistical programs previously held in the statistical program library means, thereby improving the efficiency of developmental According to the present invention, the statistical program library means comprises a basic function library of basic functions such as addition, subtraction, and logical operations, and statistical program library generating means for generating a statistical program to be added to a statistical program library by using the basic functions of the basic function library. This allows the user to freely form any statistical program and perform evaluation by using the program.

According to the present invention, the statistical data sampling program executing means comprises means for sequentially collecting statistical data for a plurality of evaluation items. Consequently, a plurality of evaluation items can be simultaneously evaluated.

According to the present invention, the statistical data sampling program executing means has a function of interrupting processing for an evaluation item currently being executed and processing the next evaluation item in accordance with an instruction from a user, and a function of restarting processing for the evaluation item interrupted in accordance with an instruction from the user.

The encryption strength evaluation support apparatus of the present invention achieves the following effects.

Encryption strength can be evaluated independently of any specific decoding method because statistical evaluation is performed on the basis of the correlation between input and output data of an encryption device. Therefore, even when the encryption algorithm is unknown, evaluation is possible if input and output data sequences of an encryption device are obtainable. To. evaluate strength by a known plaintext amount necessary to conventional evaluation, e.g., linear decoding, a linear approximate expression of an encryption algorithm must be obtained beforehand. However, if the encryption algorithm is unknown, evaluation is impossible. For example, the present invention can evaluate the strength of encryption device having tamper resistance, but cannot use an evaluation method that depends upon linear decoding.

The behavior of encryption conversion can be finely detected. This is because statistical data indicating the correlations between individual bits of input and output data of an encryption device to be evaluated is edited and output in the form of a table or the like, so details of the individual bit correlations can be known.

The behavior of encryption conversion can be easily detected. The reason for this is that statistical data indicating the correlations between individual bits of input and output data of an encryption device to be evaluated is edited and output in the form of a two- or three-dimensional graph, so the operator can intuitively recognize the data.

The encryption strengths of a plurality of encryption devices can be easily compared. This reason is that statistical data indicating the correlations between individual bits of input and output data of a plurality of encryption devices are edited and compared in the form of the same table or graph, so the operator can compare details of the behaviors of these encryption devices.

An encryption device can be efficiently designed for reasons explained below. That is, in the process of designing an encryption algorithm, the behaviors of the encryption algorithm before and after correction can be easily analyzed, and relative strength comparison is easy to perform. Additionally, the evaluation object program forming means can perform processes from correction to evaluation of a program as a series of operations.

The above and many other objects, features and advantages of the present invention will become manifest to those skilled in the art upon making reference to the following detailed description and accompanying drawings in which preferred embodiments incorporating the principles of the present invention are shown by. way of illustrative examples.

BRIEF DESCRIPTION OF THE DRAWINGS

FIG. 11 is a view showing an evaluation object program;

FIG. 12 is a view showing evaluation conditions;

FIG. 13 is a view showing settings of interface functions between an evaluation object program and statistical programs;

FIG. 14 is a view showing the status of execution of the statistical data sampling program displayed on a display device;

FIG. 15 is a view showing a table displayed when statistical data is edited and output;

DETAILED DESCRIPTION OF PREFERRED EMBODIMENTS

Several preferred embodiments of the present invention will be described in detail below with reference to the accompanying drawings.

Figure 1:
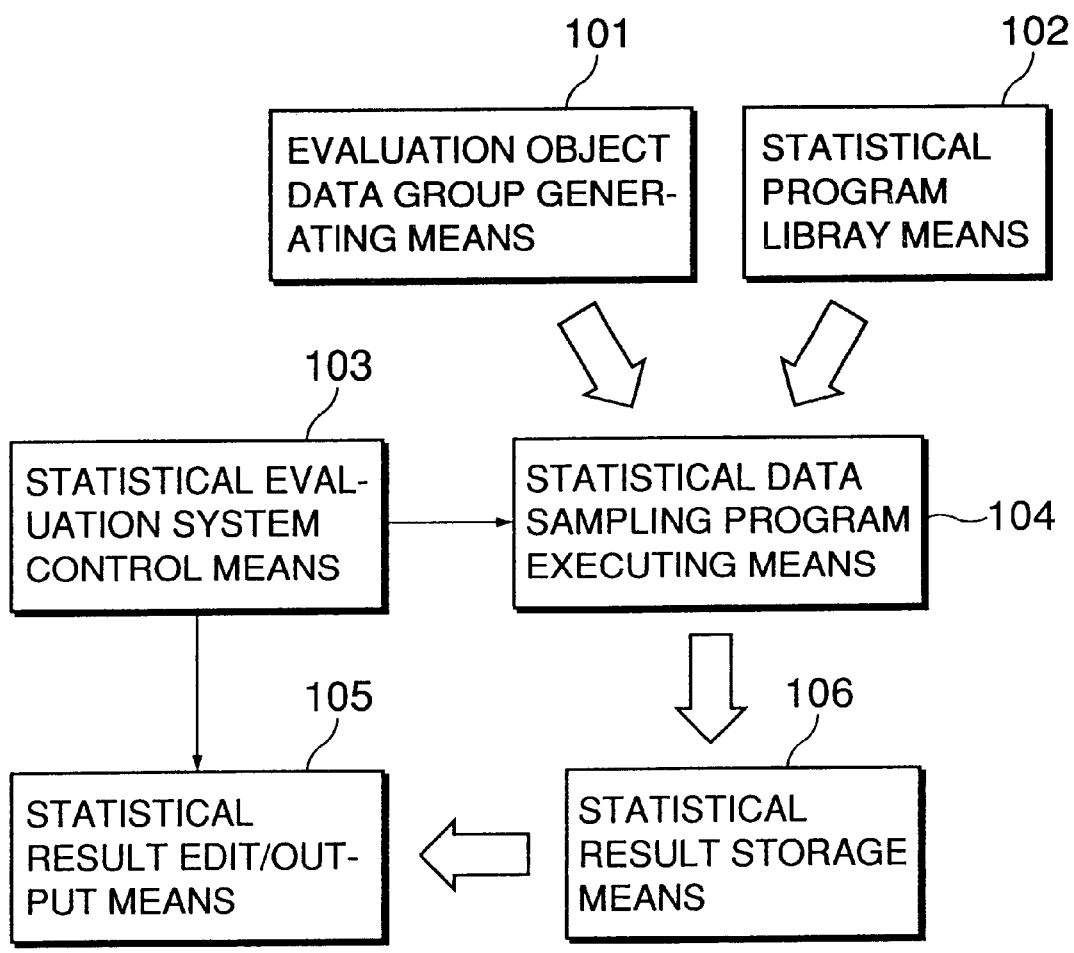
FIG. 1 is a block diagram showing the whole configuration of one embodiment of the present invention.

Referring to FIG. 1, an encryption strength evaluation support apparatus according to one embodiment of the present invention includes an evaluation object data group generating means 101, a statistical program library means 102, a statistical evaluation system control means 103, a statistical data sampling program executing means 104, a statistical result edit/output means 105, and a statistical result storage means 106.

The statistical program library means 102 has a statistical program library which is a library of statistical programs each for calculating data necessary to evaluate a corresponding predetermined evaluation item. This statistical program library means 102 also has a support function of allowing the evaluation operator to form arbitrary statistical programs. Examples of the statistical evaluation items are bit balance, output bit correlation, input bit-output bit correlation, and avalanche (each item will be described in detail later).

The evaluation object data group generating means 101 has an evaluation object data group containing an evaluation object program whose encryption strength is to be evaluated, the evaluation conditions, and an interface between the evaluation object program and the statistical programs. The evaluation object data group generating means 101 also has a support function of allowing the evaluation operator to form arbitrary encryption algorithms to be evaluated and evaluation conditions.

The statistical data sampling program executing means 104 receives an evaluation object data group from the evaluation object data group generating means 1011, and also receives statistical programs for calculating data necessary to evaluate the evaluation items of the evaluation object data group from a statistical program library (303 in FIG. 3) of the statistical program library means 102. The statistical data sampling program executing means 104 has a function of generating, from these input data group and statistical programs, a statistical data sampling program (406 in FIG. 4) for statistically calculating the correlation between each bit of input data and each bit of output data of an encryption algorithm to be evaluated, and executing the generated program.

The statistical result storage means 106 stores the statistical results of the correlations between individual bits of the encryption algorithm input and output data sampled by the statistical data sampling program executing means 104.

The statistical result edit/output means 105 edits and outputs the bit correlations stored in the statistical result storage means 106 in the form of a table or a two- or three-dimensional graph.

The statistical evaluation system control means 103 receives various instructions from the evaluation operator and controls the statistical data sampling program executing means 104 and the statistical result edit/output means 105 in accordance with the contents of these instructions.

In the encryption strength evaluation support apparatus of this embodiment having the above configuration, the evaluation operator prepares a statistical program library in the statistical program library means 102 and also prepares an evaluation object data group, which describes a program to be evaluated, evaluation conditions such as items to be evaluated, and an interface between the evaluation object program and necessary statistical programs, in the evaluation object data group generating means 101. After that, the operator instructs the apparatus to sample statistical data. In accordance with the instruction from the statistical evaluation system control means 103, the statistical data sampling program executing means 104 generates and executes a statistical data sampling program on the basis of the evaluation object data group and statistical program library. Consequently, the correlations between individual bits of input and output data of an encryption algorithm to be evaluated are statistically obtained and stored in the statistical result storage means 106. The operator then instructs the apparatus to edit and output the statistical results. In accordance with the instruction from the statistical evaluation system control means 103, the statistical result edit/output means 105 edits and outputs the statistical results stored in the statistical result storage means 106 in the form of a table or a two- or three-dimensional graph. This allows the operator to finely and easily recognize the behavior of encryption conversion of the encryption algorithm to be evaluated.

The arrangement and operation of each component of the encryption strength evaluation support apparatus of this embodiment will be described in detail below.

Figure 2:
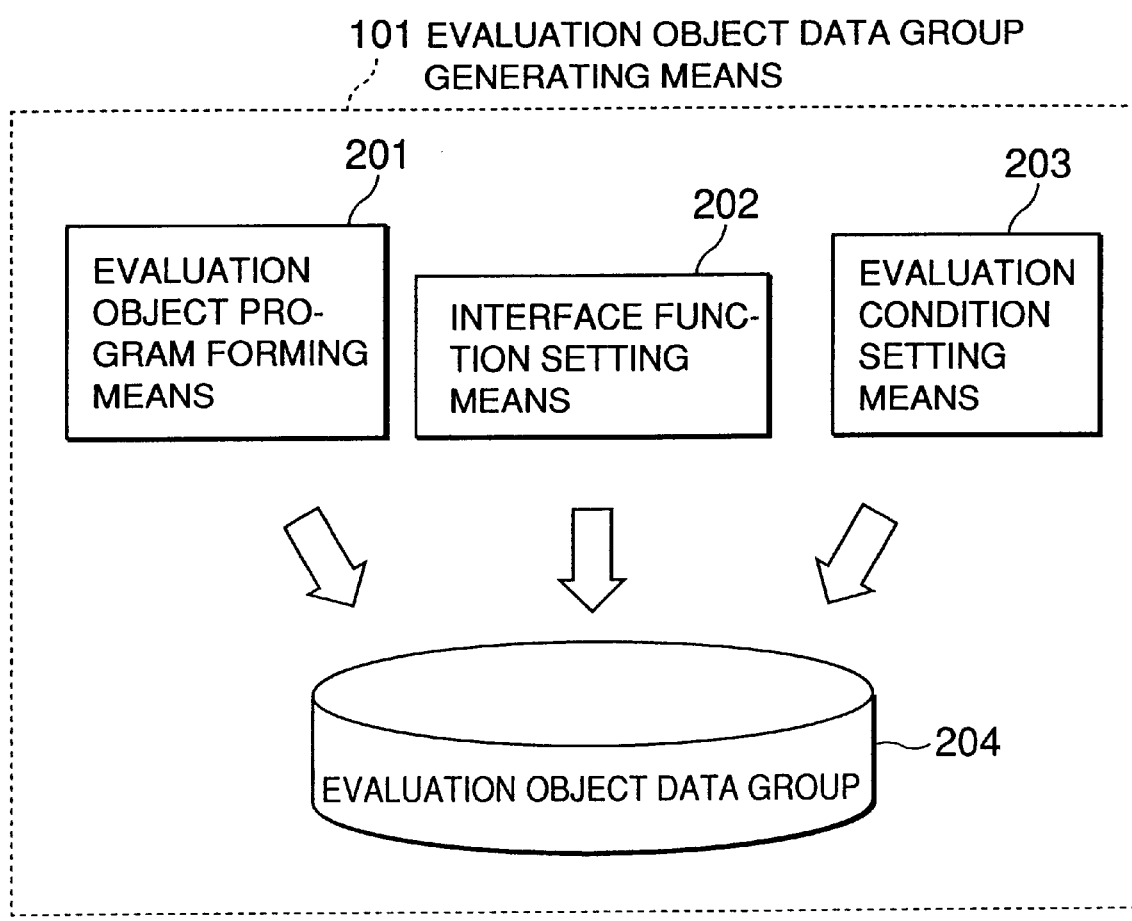
FIG. 2 is a block diagram showing the arrangement of an evaluation object data group generating means used in the embodiment of the present invention.
Figure 3:
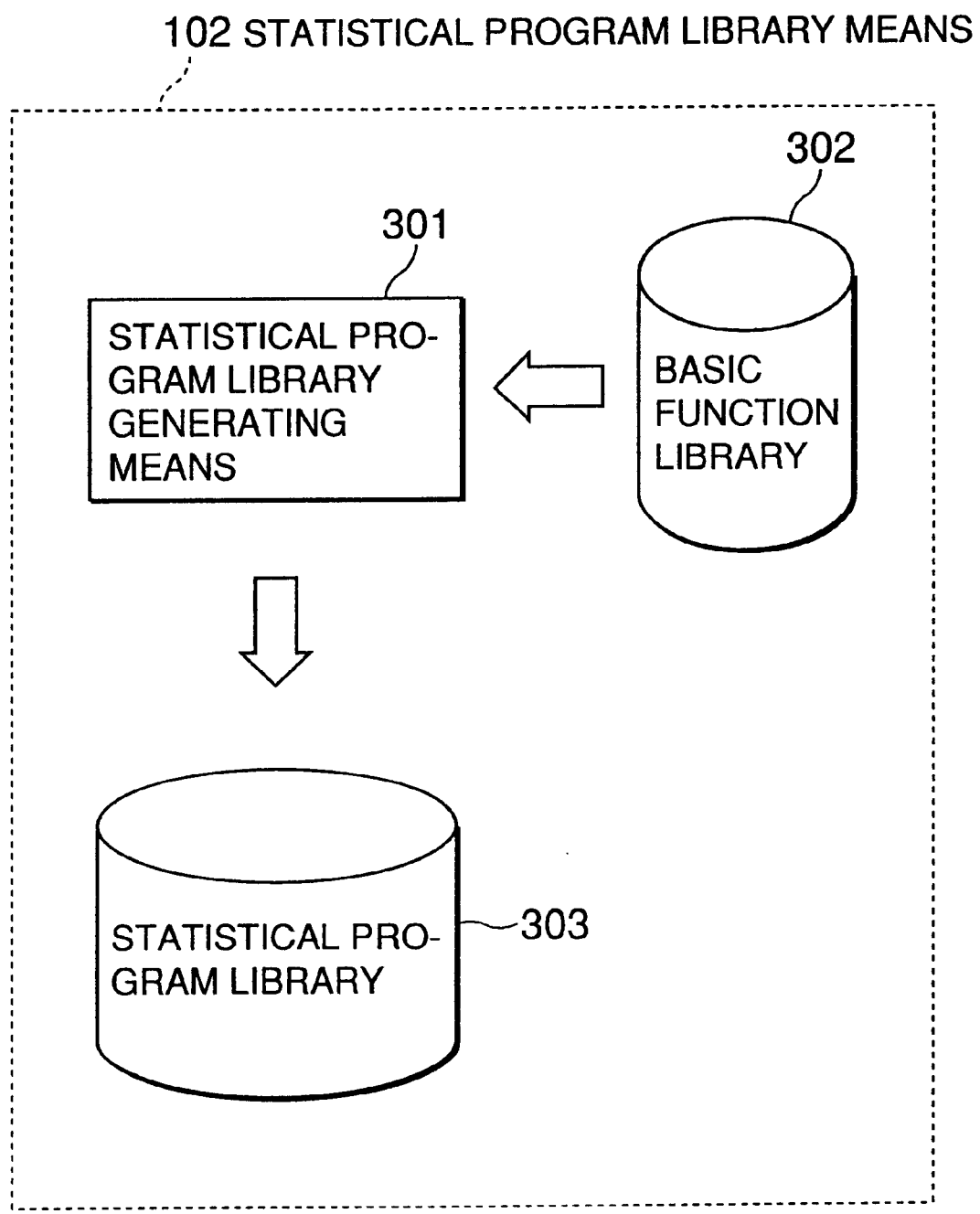
FIG. 3 is a block diagram showing the arrangement of a statistical program library means used in the embodiment of the present invention.

FIG. 2 is a block diagram showing the arrangement of the evaluation object data group generating means 101. FIG. 3 is a block diagram showing the arrangement of the statistical program library means 102.

Referring first to FIG. 3, this statistical program. library means 102 comprises a basic function library 302, a statistical program library generating means 301, and a statistical program library 303. The basic function library 302 is a library of basic functions, i.e., basic calculation functions such as addition, subtraction, logical operations, and mean calculations. The statistical program library generating means 301 provides the evaluation operator with a statistical program formation environment by using the basic functions prepared in the basic function library 302. The statistical program library 303 stores statistical programs generated by the statistical program library generating means 301.

A statistical program generates, as evaluation data, input plaintext and a key to an encryption algorithm to be evaluated, calculates output ciphertext obtained when the evaluation data is input to the encryption algorithm, and also calculates statistical data from the evaluation data. A statistical program is prepared for each evaluation item. The contents of some representative evaluation items and the functions of statistical programs necessary for these items will be described below. Assume that the evaluation object algorithm is F, the plaintext is M, the key is K, the output of the evaluation object algorithm is F (M,K), the input bit width is n, and the output bit width is m.

Avalanche Evaluation

Avalanche evaluation evaluates the effect a one-bit change in input data has on an output bit by following, e.g., the procedure below.

(1) Generate M by random numbers.

(2) Calculate F(M,K).

(3) Invert the ith bit of M by one bit to form data $M_i$.

(4) Calculate $F(M_i,K)$.

(5) If the jth bit of F(M,K) xor $F(M_i,K)$ is 0 or 1, add −1 or 1, respectively, to an element $A_{ij}$ of a two-dimensional matrix A of n rows×m columns (xor; exclusive-OR).

(6) Repeat (1) to (5) for large numbers of Ms and Ks. Consequently, each element of A stores [count of inversion−count of non-inversion] of a specific output bit when a specific input bit is inverted. This is avalanche data.

Of the above procedure, an avalanche evaluation statistical program performs the processes of generating large numbers of Ms and Ks by random numbers and updating A on the basis of the result of F(M,K) xor F($M_i$,K). An evaluation object program performs the process of calculating F(M,K) and F($M_i$,K). Note that passing on of evaluation data generated by the statistical program to the evaluation object program and passing on of data generated by the evaluation object program to the statistical program are performed in accordance with an interface between the evaluation object program and the statistical program in the evaluation object data group. This applies to each of the following evaluation items.

Input Bit-output Bit Correlation Evaluation

Input bit-output bit correlation evaluation evaluates the correlation between each bit of input data and each bit of output data by following, e.g., the procedure below.

(1) Generate M by random numbers.
(2) Calculate F(M,K).
(3) Exclusive-OR each bit i of M and each bit j of F(M,K). If the operation result is 0 or 1, add −1 or 1, respectively, to an element $A_{ij}$ of a two-dimensional matrix A of n rows x m columns.
(4) Repeat (1) to (3) for large numbers of Ms and Ks. Consequently, each element of A stores [count of mismatch−count of match] between a specific input bit and a specific output bit. This is input bit-output bit correlation data.

Of the above procedure, an input bit-output bit correlation evaluation statistical program performs the processes of generating large numbers of Ms and Ks by random numbers and updating A by exclusive-ORing each bit of M and each bit of F(M,K). An evaluation object program performs the process of calculating F(M,K).

Output Bit Correlation Evaluation

Output bit correlation evaluation evaluates the correlation between individual bits of output data by following, e.g., the procedure below.

(1) Generate M by random numbers.
(2) Calculate F(M,K).
(3) Exclusive-OR each bit i of F(M,K) and another bit I of F(M,K). If the operation result is 0 or 1, add −1 or 1, respectively, to an element $A_{ij}$ of a two-dimensional matrix A of n rows x m columns.
(4) Repeat (1) to (3) for large numbers of Ms and Ks. Consequently, each element of A stores [count of mismatch−count of match] between two specific output bits. This is output bit correlation data.

Of the above procedure, an output bit correlation evaluation statistical program performs the processes of generating large numbers of Ms and Ks by random numbers and updating A by exclusive-ORing each bit i of F(M,K) and another bit j of F(M,K). An evaluation object program performs the process of calculating F(M,K).

Bit Balance Evaluation

Bit balance evaluation evaluates the frequencies of occurrence of 1 and 0 for each bit of output data by following, e.g., the procedure below.

(1) Generate M by random numbers.
(2) Calculate F(M,K).
(3) If each bit i of F(M,K) is 0 or 1, add −1 or 1, respectively, to an element $B_i$ of a one-dimensional matrix B of m rows.
(4) Repeat (1) to (3) for large numbers of Ms and Ks. Consequently, each element of B stores [count of appearance of 1−count of appearance of 0] of a specific output bit. This is bit balance data.

Of the above procedure, a bit balance evaluation statistical program performs the processes of generating large numbers of Ms and Ks by random numbers and updating B in accordance with the value of each bit of F(M,K). An evaluation object program performs the process of calculating F(M,K).

The statistical program library generating means 301 for supporting the formation of the various statistical programs described above and the basic function library 302 can be realized by, e.g., Microsoft Visual C++ 4.2. If no appropriate statistical program exists in the statistical program library 303, the evaluation operator can form a desired statistical program under the environment provided by the statistical program library generating means 301 by using the basic calculation functions such as addition, subtraction, logical operations, and mean calculations in the basic function library 302, and add the formed program to the statistical program library 303.

Referring back to FIG. 2, the evaluation object data group generating means 101 comprises an evaluation object program forming means 201, an interface function setting means 202, an evaluation condition setting means 203, and an evaluation object data group 204.

The evaluation object program forming means 201 provides the evaluation operator with an environment for forming an evaluation object program.

The evaluation condition setting means 203 provides the evaluation operator with an environment for setting items to be evaluated for an evaluation object program and the evaluation conditions such as a key and data widths.

The interface function setting means 202 provides the evaluation operator with an environment for setting an interface between an evaluation object program and statistical programs. As described earlier in the explanation of evaluation items, an evaluation object program is evaluated by using statistical programs, but the evaluation object program and the statistical programs are formed separately. Therefore, an interface for exchanging data between the two kinds of programs must be prepared beforehand. The interface function setting means 202 allows the evaluation operator to form such an interface.

The evaluation object program forming means 201, the interface function setting means 202, and the evaluation condition setting means 203 described above can be realized by, e.g., Microsoft Visual C++ 4.2.

As described above, in the evaluation object data group generating means 101 shown in FIG. 2, the encryption strength evaluation support apparatus itself is given the evaluation object program forming means 201. Consequently, it is possible to efficiently perform a series of operations of design evaluation correction reevaluation of an encryption algorithm. Additionally, the apparatus has the interface function setting means 202 and the evaluation condition setting means 203. This allows evaluation of arbitrary items of a formed evaluation object program.

Figure 4:
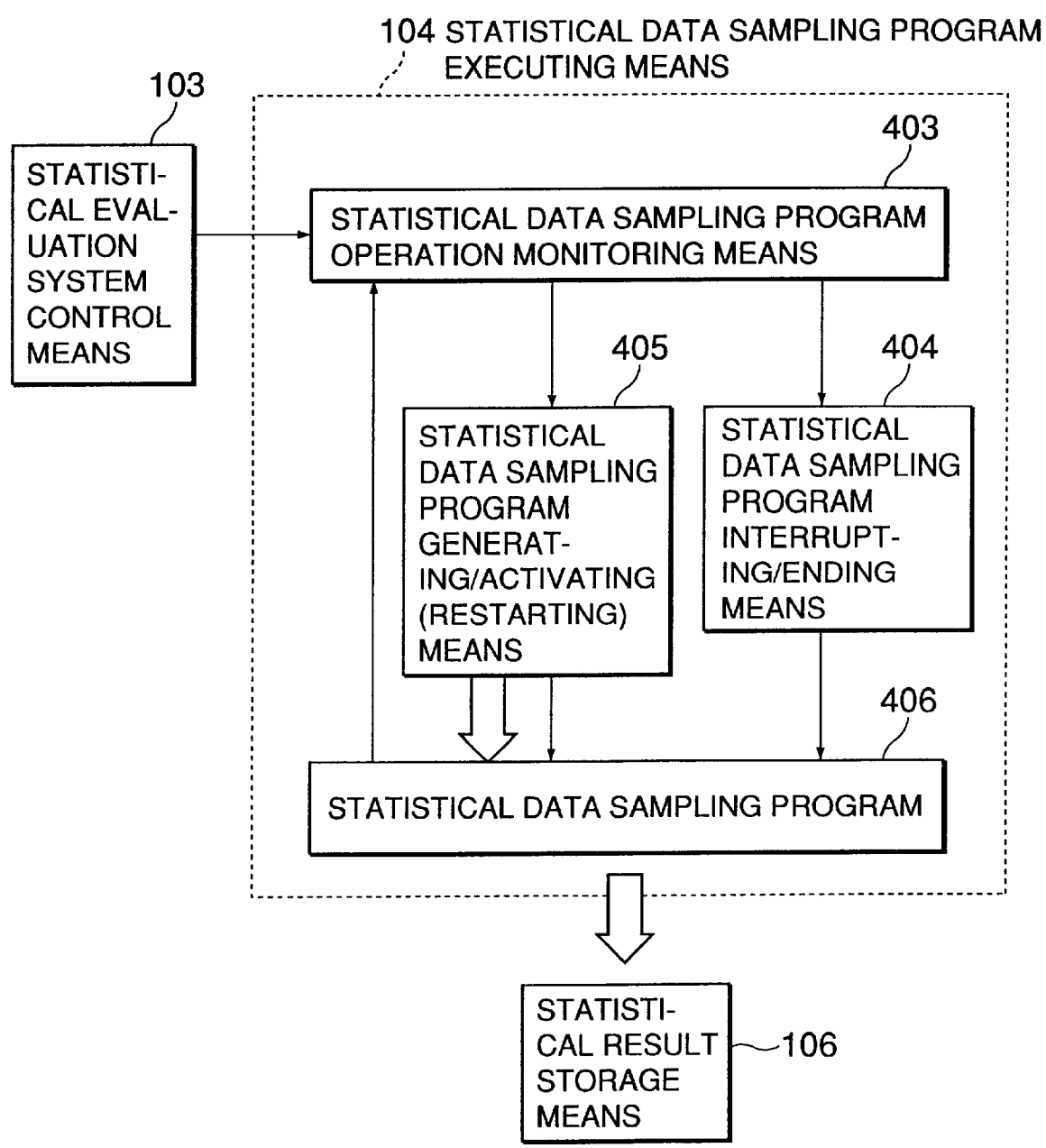
FIG. 4 is a block diagram showing the arrangement of a statistical data sampling program executing means used in the embodiment of the present invention.
Figure 5:
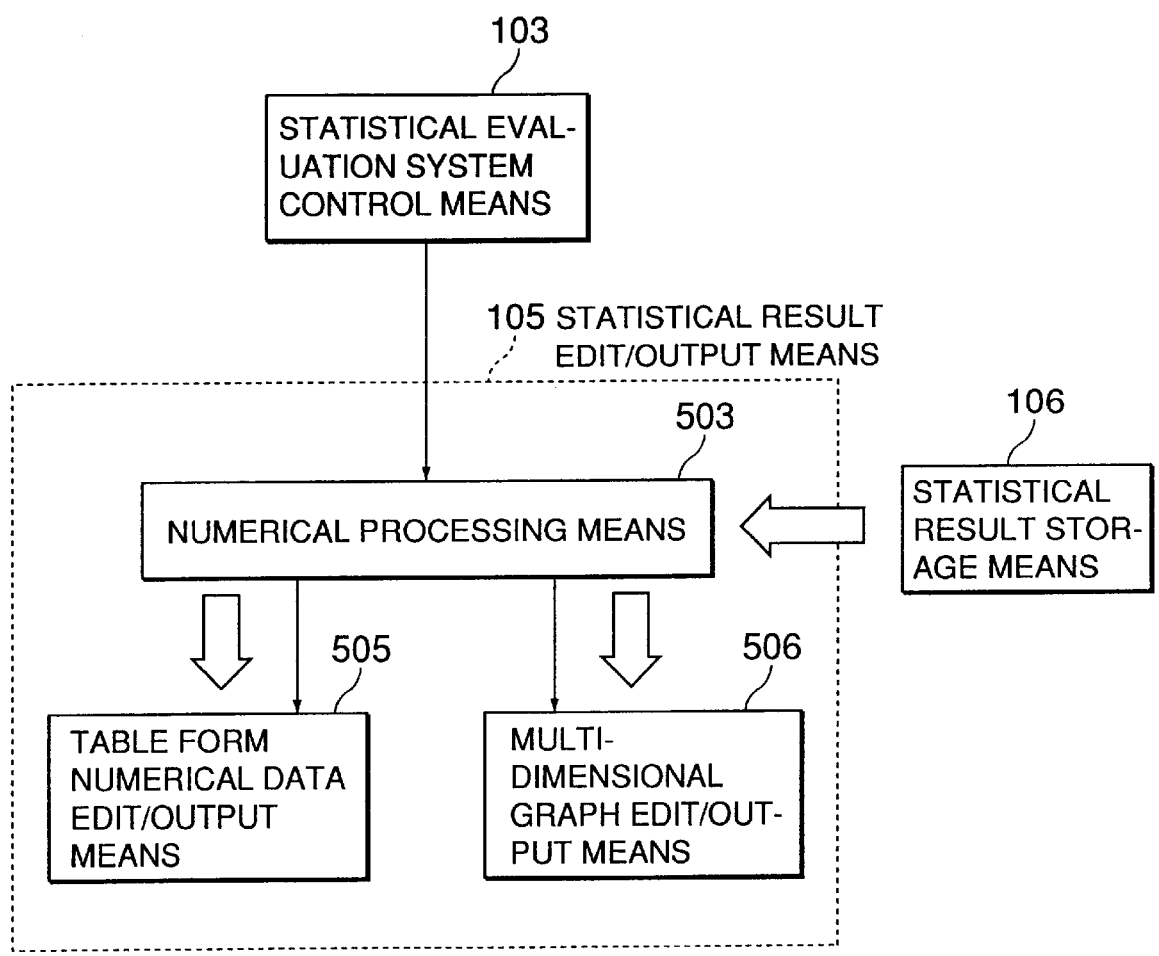
FIG. 5 is a block diagram showing the arrangement of a statistical result edit/output means used in the embodiment of the present invention.
Figure 6:
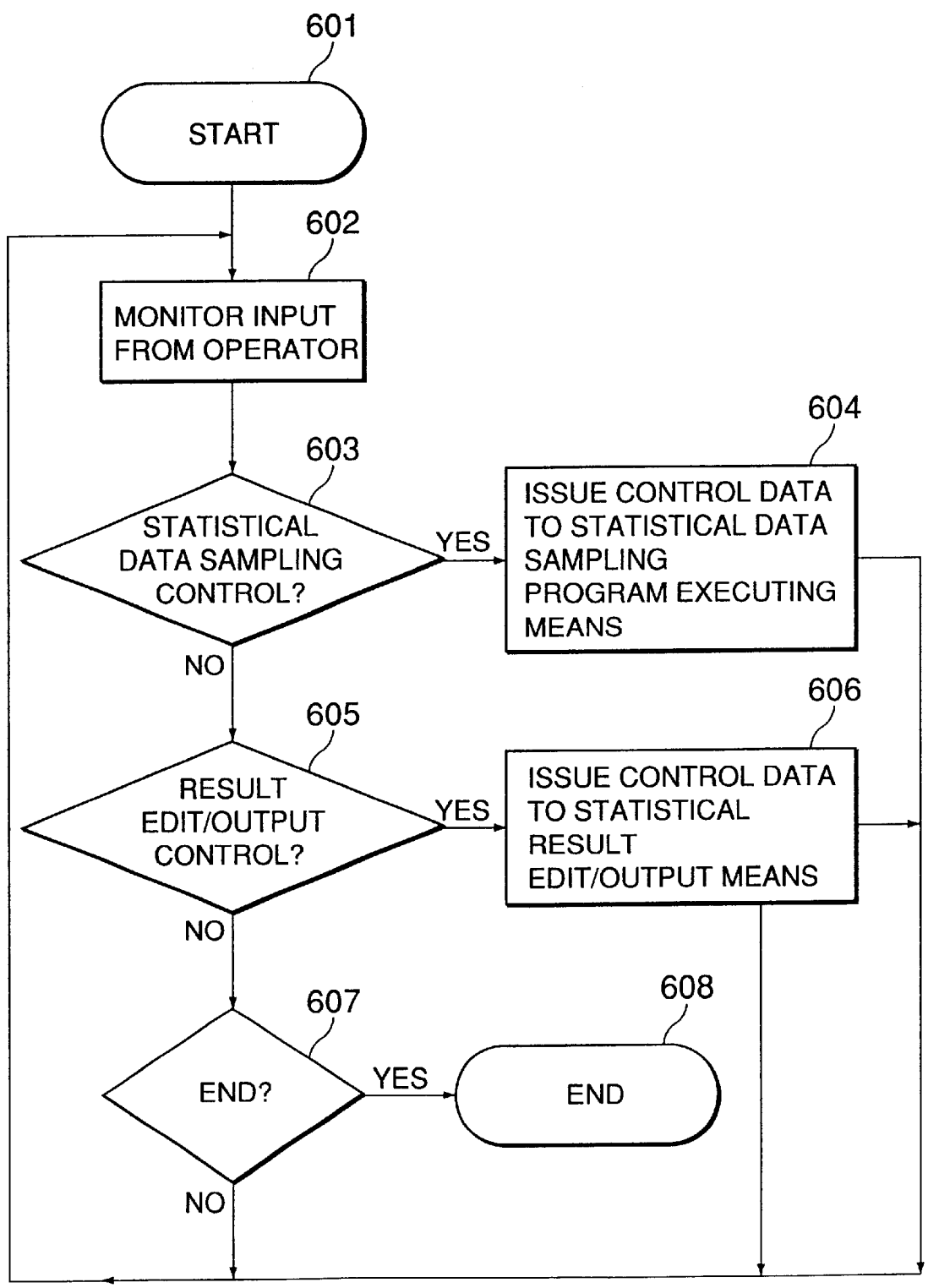
FIG. 6 is a flow chart showing the operation of a statistical evaluation system control means used in the embodiment of the present invention.

FIG. 4 is a block diagram showing the arrangement of the statistical data sampling program executing means 104. FIG. 5 is a block diagram showing the arrangement of the statistical result edit/output means 105. FIG. 6 is a flow chart showing the operation of the statistical evaluation system control means 103. FIGS. 7 to 10 are flow charts showing the operation of each means in the statistical data sampling program executing means 104. The rest of the components will be described below with reference to these drawings.

Referring first to FIG. 6, the statistical evaluation system control means 103 starts operating (step 601) and monitors inputs from an operator (step 602). An input signal detected in this operator input monitoring can take any form provided that the signal can designate the following control. For example, the signal form can be key input by an operator, input from a separately prepared operation panel, or information of a control signal from a certain control program.

If input from the operator is detected in step S602, the statistical evaluation system control means 103 checks the contents of control indicated by the input instruction (steps 603, 605, and 607). The contents of input control instruction from an operator are roughly classified into an instruction concerning statistical data sampling, an instruction concerning edit/output of statistical results, and an instruction directing end of the statistical evaluation system control means 103 itself. The input instruction concerning statistical data sampling from an operator is one of an instruction directing start (restart) of sampling and an instruction directing interruption of sampling.

If the control instruction is about statistical data sampling (YES in step 603), the statistical evaluation system control means 103 issues control data to the statistical data sampling program executing means 104 (step 604), and the flow returns to the operator input monitoring in step 602. If the input instruction concerning statistical data sampling from the operator indicates sampling start (restart) or sampling interruption, the statistical evaluation system control means 103 issues control data indicating data sampling start or control data indicating data sampling end, respectively, to the statistical data sampling program executing means 104.

If the control instruction is about edit/output of statistical results (YES in step 605), the statistical evaluation system control means 103 issues control data to the statistical result edit/output means 105 (step 606), and the flow returns to the operator input monitoring in step 602.

If the control instruction indicates end of the statistical evaluation system control means 103 itself (YES in step 607), the statistical evaluation system control means 103 performs necessary end processes, e.g., issues control data indicating program operation end to the statistical data sampling program executing means 104, and ends itself (step 608).

Referring to FIG. 4, the statistical data sampling program executing means 104 comprises a statistical data sampling program operation monitoring means 403, a statistical data sampling program interrupting/ending means 404, a statistical data sampling program generating/activating (restarting) means 405, and a statistical data sampling program 406. The statistical data sampling program generating/activating (restarting) means 405 generates and activates (restarts) the statistical data sampling program 406 under the control of the statistical data sampling program operation monitoring means 403. The statistical data sampling program interrupting/ending means 404 interrupts or ends the statistical data sampling program 406 under the control of the statistical data sampling program operation monitoring means 403. The statistical data sampling program operation monitoring means 403 controls the statistical data sampling program generating/activating (restarting) means 405 and the statistical data sampling program interrupting/ending means 404 and thereby controls the execution of the statistical data sampling program 406, under the control of the statistical evaluation system control means 103 and in accordance with end information from the statistical data sampling program 406.

Figure 7:
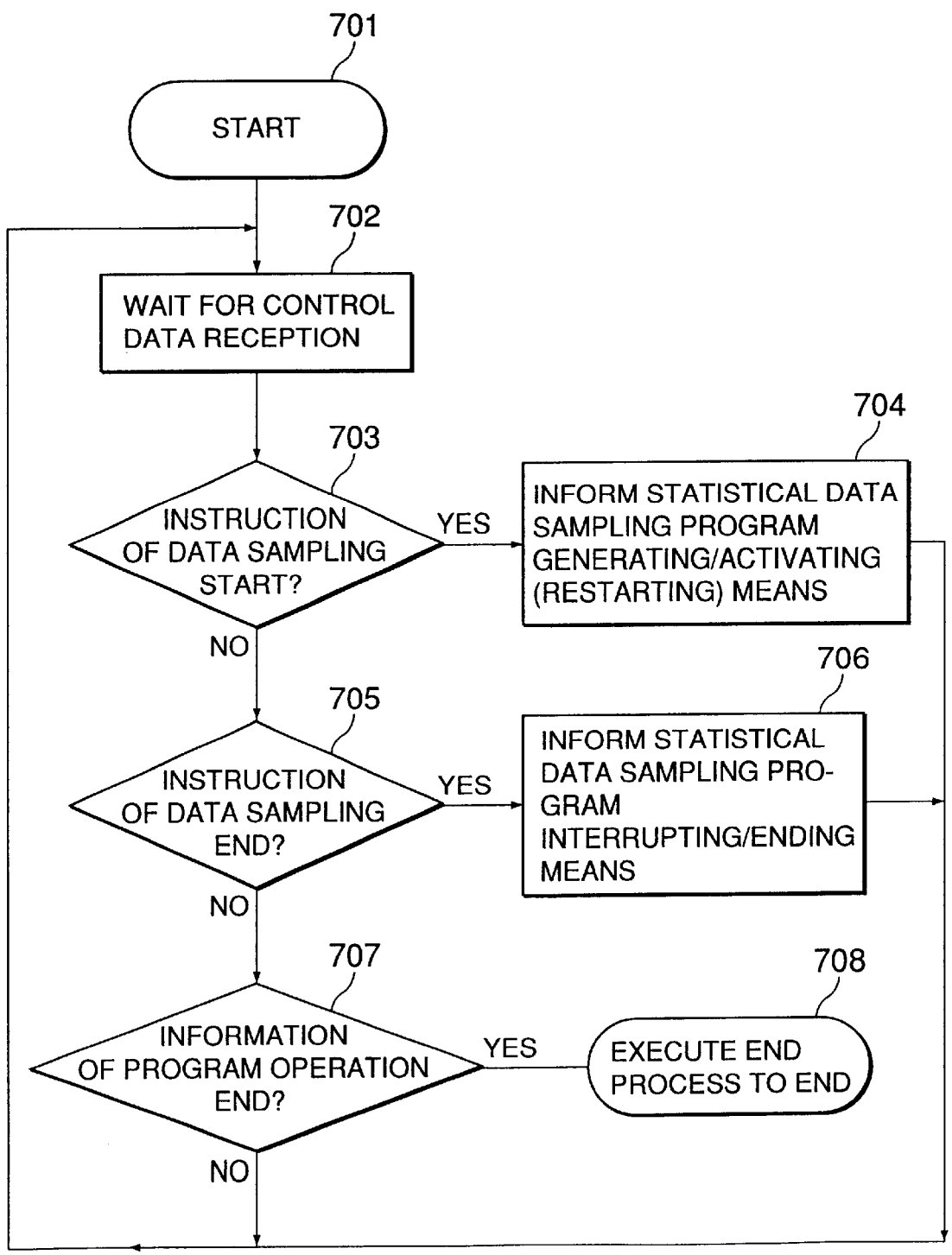
FIG. 7 is a flow chart showing the operation of a statistical data sampling program operation monitoring means used in the embodiment of the present invention.

Referring to FIG. 7, the statistical data sampling program operation monitoring means 403 starts operating (step 701) and executes operations in steps 702 to 708. First, the statistical data sampling program operation monitoring means 403 waits for the reception of control data from the statistical evaluation system control means 103 (step 702). If control data is detected, the statistical data sampling program operation monitoring means 403 checks the contents of control indicated by the control data (steps 703, 705, and 707). The control data transmitted from the statistical evaluation system control means 103 is one of control data indicating data sampling start, control data indicating data sampling end, and control data indicating the end of the program operation.

If the control data from the statistical evaluation system control means 103 indicates data sampling start (YES in step 703), the statistical data sampling program operation monitoring means 403 issues control data to the statistical data sampling program generating/activating (restarting) means 405 (step 704), and the flow returns to step 702 to wait for the reception of control data from the statistical evaluation system control means 103. If the statistical data sampling program 406 is not generated in step 704, the statistical data sampling program operation monitoring means 403 issues control data instructing the generation of a statistical data sampling program. If the statistical data sampling program 406 is already generated in step 704, the statistical data sampling program operation monitoring means 403 issues control data instructing the activation of the statistical data sampling program.

If the control data from the statistical evaluation system control means 103 indicates data sampling end (YES in step 705), the statistical data sampling program operation monitoring means 403 issues control data instructing the interruption of the statistical data sampling program 406 to the statistical data sampling program interrupting/ending means 404 (step 706), and the flow returns to step 702 to wait for the reception of control data from the statistical evaluation system control means 103.

If the control data from the statistical evaluation system control means 103 indicates the end of the program operation (YES in step 707), the statistical data sampling program operation monitoring means 403 performs end processes, e.g., issues control data instructing the end of the program operation to the statistical data sampling program generating/activating (restarting) means 405 and the statistical data sampling program interrupting/ending means 404, and ends itself after receiving end information from the statistical data sampling program 406 (step 708).

Figure 8:
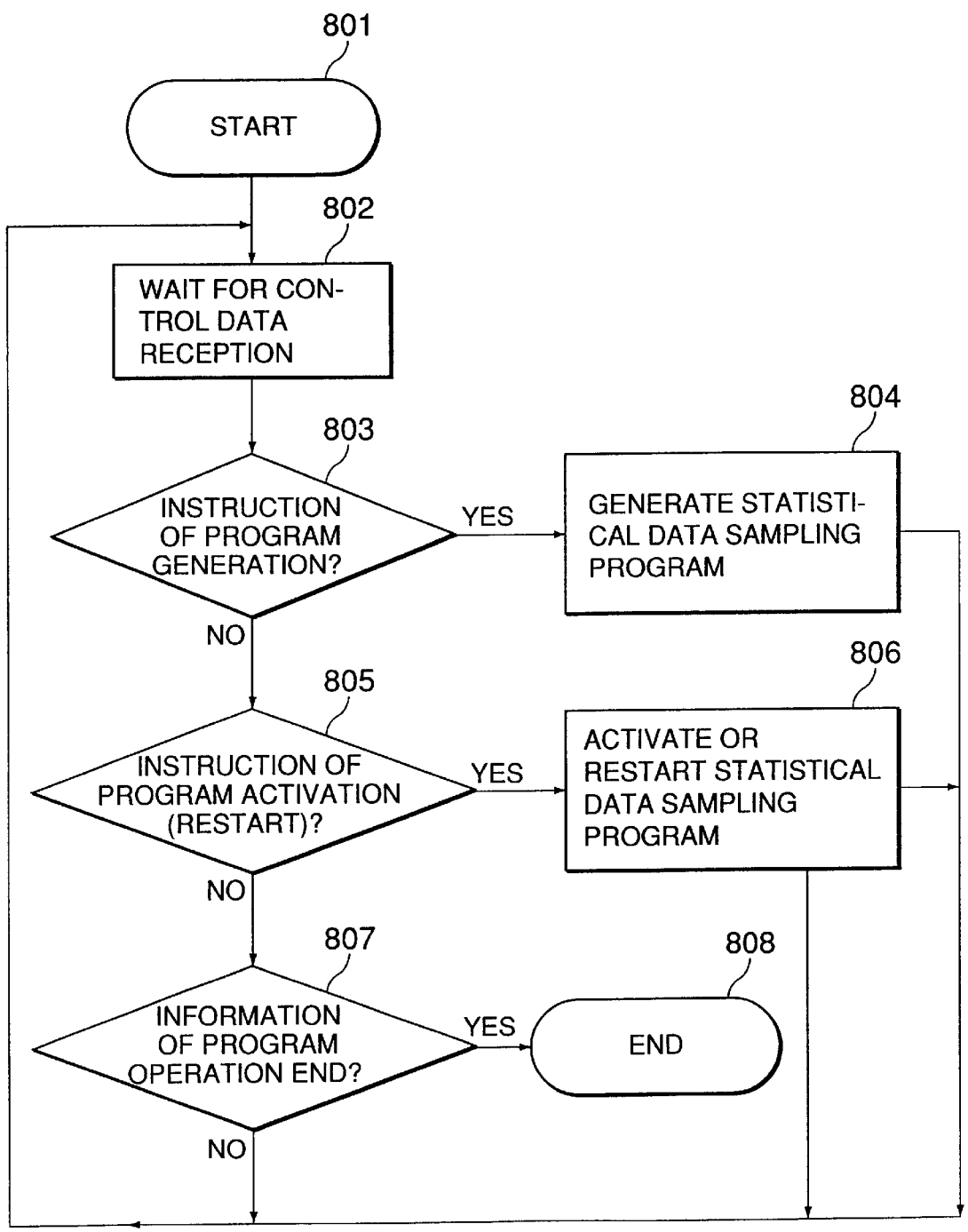
FIG. 8 is a flow chart showing the operation of a statistical data sampling program generating/activating (restarting) means used in the embodiment of the present invention.

Referring to FIG. 8, the statistical data sampling program generating/activating (restarting) means 405 starts operating (step 801) and executes operations in steps 802 to 808. First, the statistical data sampling program generating/activating (restarting) means 405 waits for the reception of control data from the statistical data sampling program operation monitoring means 403 (step 802). If the control data is detected, the statistical data sampling program generating/activating (restarting) means 405 checks the contents of control indicated by the control data (steps 803, 805, and 807). The control data transmitted from the statistical data sampling program operation monitoring means 403 is one of control data instructing the generation of the statistical data sampling program 406, control data instructing the activation (restart) of the program 406, and control data instructing the end of the program operation.

If the control data from the statistical data sampling program operation monitoring means 403 indicates the generation of the statistical data sampling program 406 (YES in step 803), the statistical data sampling program generating/activating (restarting) means 405 generates the statistical data sampling program 406 on the basis of the evaluation object data group 204 in the evaluation object data group generating means 101 and necessary statistical programs in the statistical program library 303 of the statistical program library generating means 102 (step 804). The statistical data sampling program generating/activating (restarting) means 405 activates the generated statistical data sampling program 406 (step 806), and the flow returns to step 802 to wait for the reception of control data from the statistical data sampling program operation monitoring means 403.

If the control data from the statistical data sampling program operation monitoring means 403 indicates program activation (restart) (YES in step 805), the statistical data sampling program generating/activating (restarting) means 405 activates or restarts the statistical data sampling program 406 (step 806), and the flow returns to step 802 to wait for the reception of control data from the statistical data sampling program operation monitoring means 403.

If the control data from the statistical data sampling program operation monitoring means 403 indicates the end of the program operation (YES in step 807), the statistical data sampling program generating/activating (restarting) means 405 performs necessary end processes and ends itself (step 808).

Figure 9:
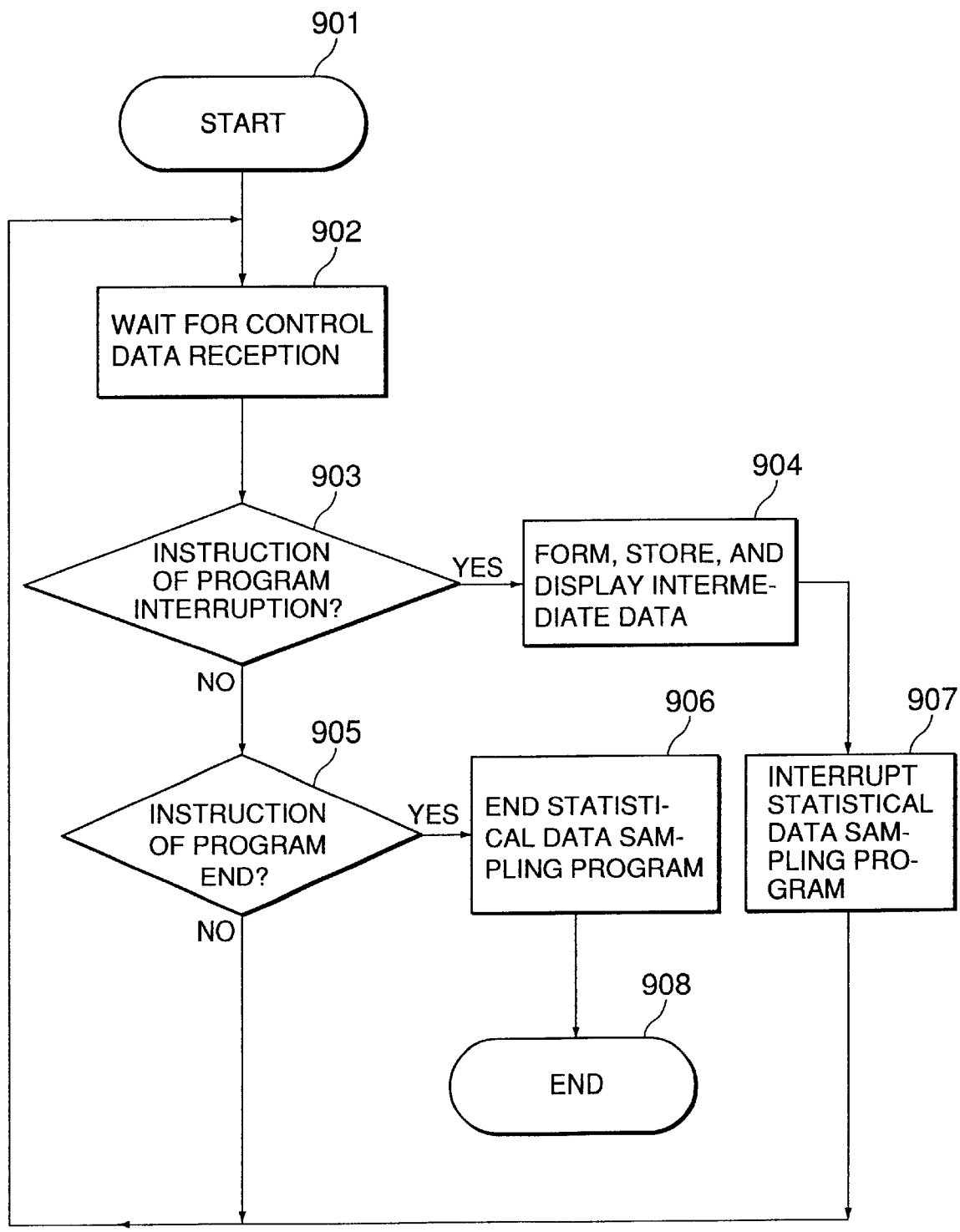
FIG. 9 is a flow chart showing the operation of a statistical data sampling program interrupting/ending means used in the embodiment of the present invention.

Referring to FIG. 9, the statistical data sampling program interrupting/ending means 404 starts operating (step 901) and executes operations in steps 902 to 908. First, the statistical data sampling program interrupting/ending means 404 waits for the reception of control data from the statistical data sampling program operation monitoring means 403 (step 902). If the control data is detected, the statistical data sampling program interrupting/ending means 404 checks the contents of control indicated by the control data (steps 903 and 905). The control data transmitted from the statistical data sampling program operation monitoring means 403 is one of control data instructing the Interruption of the statistical data sampling program 406 and control data instructing the end of the program operation.

If the control data from the statistical data sampling program operation monitoring means 403 indicates the interruption of the statistical data sampling program 406 (YES in step 903), the statistical data sampling program interrupting/ending means 404 edits data sampled and held up to the point in an internal memory by the statistical data sampling program 406 into the form of intermediate data storable in the statistical result storage means 106, stores the intermediate data in the statistical result storage means 106, and, if necessary, displays various messages to the operator (step 904). Also, the statistical data sampling program interrupting/ending means 404 issues control data instructing the interruption to the statistical data sampling program 406 (step 907). The flow then returns to step 902 to wait for the reception of control data from the statistical data sampling program operation monitoring means 403.

If the control data from the statistical data sampling program operation monitoring means 403 indicates the end of the program operation (YES in step 905), the statistical data sampling program interrupting/ending means 404 performs end processes, e.g., issues control data instructing the program end to the statistical data sampling program 406 (step 906) and ends itself (step 908).

Figure 10:
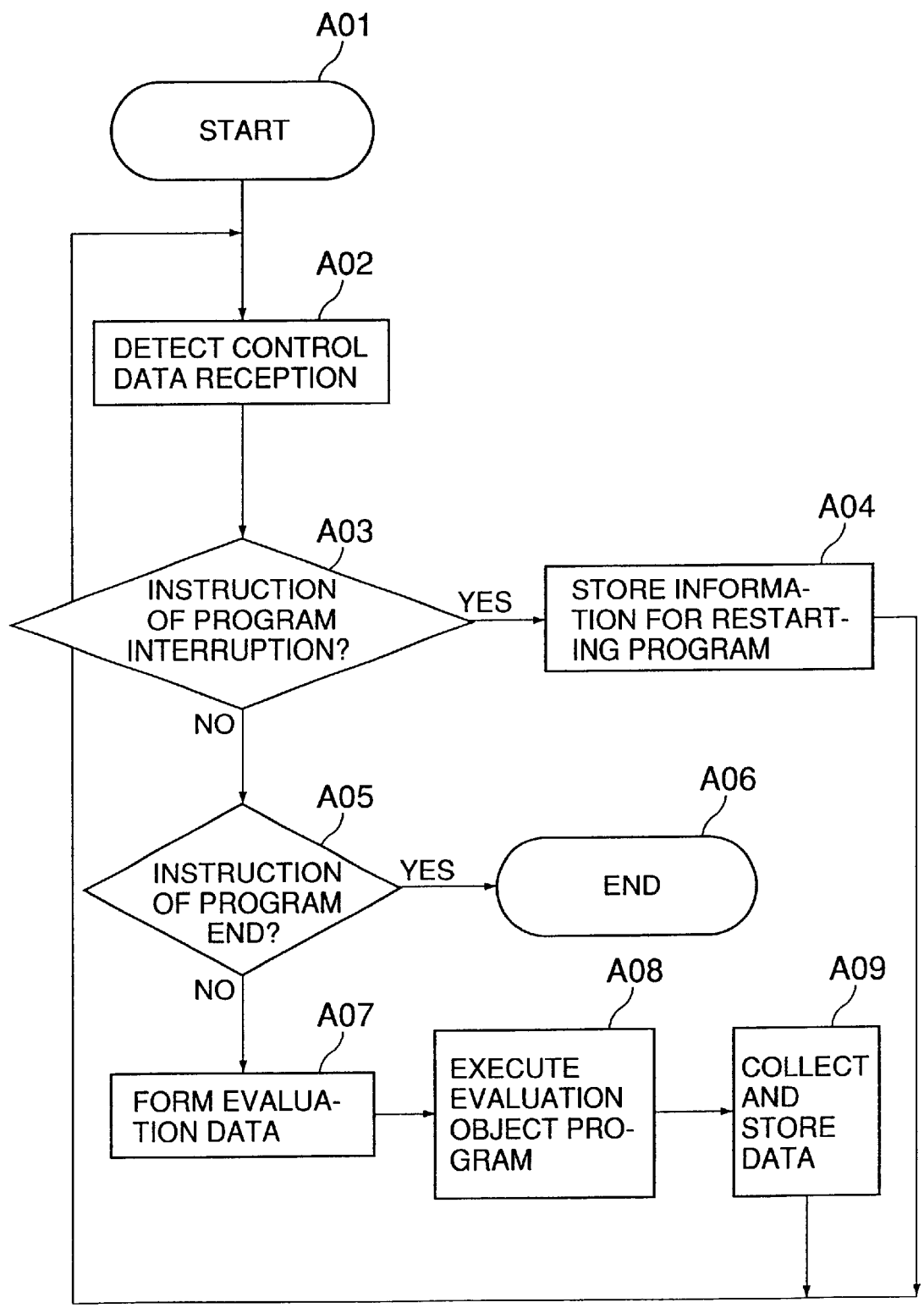
FIG. 10 is a flow chart showing the operation of a statistical data sampling program used in the embodiment of the present invention.

Referring to FIG. 10, the statistical data sampling program 406 starts operating after being generated and activated by the statistical data sampling program generating/activating (restarting) means 405 (step A01), and executes operations in steps A02 to A09.

First, the statistical data sampling program 406 detects control data reception (step A02). If the statistical data sampling program 406 detects control data from the statistical data sampling program interrupting/ending means 404 within a predetermined time in step A02 and the detected data indicates program interruption or end (steps A03 or A05), the flow advances to step A04 or A06, respectively. If the statistical data sampling program 406 detects control data instructing activation (restart) from the statistical data sampling program generating/activating (restarting) means 405 or does not detect anything, the flow advances to step A07.

In step A07, the statistical data sampling program 406 generates evaluation data. The statistical data sampling program 406 executes an evaluation object program by using this evaluation data (step A08). The statistical data sampling program 406 collects statistical data, temporarily stores the collected data in the internal memory, and then stores the data in the statistical result storage means 106 at a predetermined timing (step A09). That is, a statistical program incorporated as a part of the statistical data sampling program generates the evaluation data and collects and stores the statistical data. The evaluation data generated by this statistical program is passed on to an evaluation object program incorporated as a part of the statistical data sampling program, thereby generating output data. The statistical program calculates statistical data from the output data and evaluation data. If a plurality of evaluation items are set, the statistical data sampling program 406 samples statistical data in steps A07 to A09 in the evaluation item order designated by the evaluation conditions. Whenever a predetermined amount of statistical data is sampled for each evaluation item, the flow once returns to the control data reception detection in step A02. If no control data is detected within the predetermined time in step A02, the statistical data sampling program 406 executes steps A07 to A09 to continue the sampling of remaining statistical data.

If the control data detected in step A02 indicates the interruption of the statistical data sampling program (YES in step A03), the statistical data sampling program 406 edits program restart information, necessary to restart a program for an evaluation item processed up to the point in steps A07 to A09, into the form of intermediate data storable in the statistical result storage means 106 (step A04), and the flow returns to the control data reception detection in step A02. If no control data is detected within the predetermined time in step A02 and any uninterrupted evaluation items still exist, the statistical data sampling program 406 executes steps A07 to A09 for the next evaluation item. If all evaluation items are interrupted, the statistical data sampling program 406 keeps waiting for control data directing the restart of the program operation. If the control data is detected, the flow advances to step A07, and the statistical data sampling program 406 restarts the processing for en evaluation item interrupted earliest from the timing of the interruption.

If the control data detected in step A02 indicates end (YES in step A05), the statistical data sampling program 406 performs necessary end processes, e.g., informs the statistical data sampling program operation monitoring means 403 of the end, and ends itself (step A06).

Referring back to FIG. 5, the statistical result edit/output means 105 comprises a numerical processing means 503, a table form numerical data edit/output means 505, and a multi-dimensional graph edit/output means 506.

The table form numerical data edit/output means 505 edits the statistical data stored in the statistical result storage means 106, i.e., the statistical data indicating the correlations between individual bits of input and output data of an encryption program to be evaluated, into the form of a table and outputs the table to a display device or a printer.

The multi-dimensional graph edit/output means 506 edits the statistical data stored in the statistical result storage means 106 into the form of a two- or three-dimensional graph and outputs the graph to the display device or printer.

The numerical processing means 503 controls the table form numerical data edit/output means 505 and the multi-dimensional graph edit/output means 506 in accordance with control data from the statistical evaluation system control means 103. The numerical processing means 503 also performs numerical processing for the statistical data stored in the statistical result storage means 106 to calculate basic statistical amounts such as a mean, maximum, minimum, variance, and standard deviation. These calculated basic statistical amounts are also output together with tables and the like.

The operation of the encryption strength evaluation support apparatus according to this embodiment will be described in detail below by taking a practical encryption program as an example. Note that the operation will be described in the following order.

(1) Preparation
    (a) Preparation of statistical program library
    (b) Preparation of evaluation object data group
(2) Sampling of statistical data
    (a) Generation and activation of statistical data sampling program
    (b) Interruption of statistical data sampling program
    (c) Restart of statistical data sampling program
(3) Output of statistical data
(4) End (1) Preparation To evaluate encryption strength, it is necessary to prepare the evaluation object data group 204 containing an evaluation object program and the like and the statistical program library 303 containing necessary statistical programs. If these data group and library are already prepared, this step can be omitted.

(a) Preparation of Statistical Program Library

If no necessary statistical programs exist in the statistical program library 303, the evaluation operator activates the statistical program library generating means 301. Under the environment provided by the statistical program library generating means 301, the operator forms desired statistical programs by using the basic calculation functions such as addition, subtraction, logical operations, and mean calculations in the basic function library 302, and adds the formed programs to the statistical program library 303. In the following explanation, it is assumed that statistical programs for bit balance, output bit relation, input bit-output bit relation, and avalanche are formed and stored in the statistical program library 303.

(b) Preparation of Evaluation Object Data

An evaluation object program is formed by using the evaluation object program forming means 201. An interface between the evaluation object program and the statistical programs is set by using the interface function setting means 202. Evaluation conditions are set by using the evaluation condition setting means 203.

FIG. 11 shows an evaluation object program formed by using Microsoft Visual C++ 4.2. This evaluation object program describes an encryption algorithm which exclusive-ORs text and a masterkey to form a cipher.

FIG. 12 shows evaluation conditions formed by using Microsoft Visual C++ 4.2. Referring to FIG. 12, four items of avalanche, bit balance, input bit-output bit relation, and output bit relation are designated, in the form of declaration of a common external function, as evaluation items to be sampled. Subsequently, the following items are designated in the form of external variable declaration: a key random number seed, input data random number seed, key bit length, input data block bit length, output data block bit length, key change count indicating the count of input data by which the key is changed, data change count indicating the count of changes of input data for one key, keyboard input monitoring interval indicating the interval of keyboard input monitoring in terms of count of calculations, and automatic save interval indicating the interval of save of a calculation result into the statistical result storage means 106 in terms of count of calculations. In addition, an evaluation object program is designated in the form of external function declaration.

FIG. 13 shows settings of interface functions, formed by using Microsoft Visual C++ 4.2, between the evaluation object programs and the statistical programs. Referring to FIG. 13, a total of four functions, i.e., avalanche( );, iorelation( );, relation( );, and balance( );, are described as statistical evaluation main functions. All of these functions are statistical programs and stored in the statistical program library 303. These statistical evaluation main functions are executed in order of description. Each statistical evaluation main function is set in the key and data pass-on areas designated by the common external function shown in FIG. 12 by generating the key and the input data by using the key random number seed and the input data random number seed designated by the external variable declaration shown in FIG. 12. The bit lengths of the generated key and input data correspond to the key bit length and the input data block bit length shown in FIG. 12. Also, key and input data to be generated are changed in accordance with the key change count and the data change count shown in FIG. 12.

Other functions described in the interface shown in FIG. 13 are a function of receiving a key from the statistical evaluation function and passing on the key to the evaluation object program, a function of receiving and saving input data from the statistical evaluation function, calling the evaluation object program, and obtaining output data from the program, and a function of saving the obtained output data. On the basis of these saved input and output data, the statistical evaluation function calculates statistical data and finally outputs the calculated data to the statistical result storage means 106.

(2) Sampling of Statistical Data (a) Generation and Activation of Statistical Data Sampling Program When the operator instructs sampling of statistical data, the statistical evaluation system control means 103 detects the instruction (step 603 in FIG. 6) and sends control data instructing data sampling start to the statistical data sampling program executing means 104 (step 604).

The statistical data sampling program operation monitoring means 403 of the statistical data sampling program executing means 104 detects the control data directing data sampling start (step 703 in FIG. 7). Since the statistical data sampling program 406 has not been formed yet, the statistical data sampling program operation monitoring means 403 issues control data directing program generation to the statistical data sampling program generating/activating (restarting) means 405 (step 704).

The statistical data sampling program generating/activating (restarting) means 405 detects the control data instructing program generation (step 803 in FIG. 8). The statistical data sampling program generating/activating (restarting) means 405 receives the evaluation object data group 204 prepared in the evaluation object data group generating means 101 and necessary programs from the statistical program library 303 prepared in the statistical program library generating means 102, and generates the statistical data sampling program 406 which performs the operation as shown in FIG. 10 (step 804). When this statistical data sampling program 406 is generated, the evaluation object program as shown in FIG. 11 is linked to the interface functions as shown in FIG. 13 and to the statistical programs in the statistical program library 303, thereby generating one executable program. Then, the statistical data sampling program generating/activating (restarting) means 405 activates the generated statistical data sampling program 406 (step 806).

The statistical data sampling program 406 thus generated and activated generates evaluation data for a first evaluation item (step A07), executes the evaluation object program by using the generated evaluation data as input data (step A08), and collects and stores statistical data on the basis of the evaluation data and output data from the evaluation object program (step A09). In FIG. 13, the statistical evaluation main functions are described in the order of avalanche( );, iorelationo( );, relations( );, and balance( );. Accordingly, the statistical data are collected and saved in the order of avalanche evaluation data, input bit-output bit relation data, output bit relation data, and balance data.

The data collection of each evaluation item is continuously performed each time the count of calculations designated by the keyboard input monitor interval shown in FIG. 12 is reached. Whenever the designated count of calculations is reached, the flow once returns to the detection of control data reception in step A02. If no interruption is designated within a predetermined time, the rest of the calculation is restarted. The collected statistical data of the individual evaluation items are finally stored in the statistical result storage means 106 in units of evaluation items.

(b) Interruption of Statistical Data Sampling Program

The operator can interrupt processing for an evaluation item currently being executed and start processing for the next evaluation item by designating interruption of statistical data sampling.

When the operator instructs sampling interruption, the statistical evaluation system control means 103 detects the instruction (step 603 in FIG. 6) and issues control data instructing data sampling end to the statistical data sampling program executing means 104 (step 604).

The statistical data sampling program operation monitoring means 403 of the statistical data sampling program executing means 106 detects this control data instructing data sampling end (step 705 in FIG. 7) and issues control data instructing interruption of the program to the statistical data sampling program interrupting/ending means 404 (step 706).

The statistical data sampling program interrupting/ending means 404 detects the control data directing program interruption (step 903 in FIG. 9). The statistical data sampling program interrupting/ending means 404 edits data sampled and held up to the point in the internal memory into the form of intermediate data storable in the statistical result storage means 106, stores the intermediate data in the statistical result storage means 106, and, if necessary, displays various messages to the operator (step 904). After that, the statistical data sampling program interrupting/ending means 404 issues control data directing the interruption to the statistical data sampling program 406 (step 907).

The statistical data sampling program 406 detects the control data instructing the interruption (step A03 in FIG. 10), edits program restart information necessary to restart the program next time into the form of intermediate data storable in the statistical result storage means 106, and stores the intermediate data (step A04). The flow then returns to the detection of control data reception in step A02. If no control data is detected within a predetermined time in step A02, the statistical data sampling program 406 executes steps A07 to A09 for the next evaluation item.

(c) Restart of Statistical Data Sampling Program

If processing for all evaluation items is interrupted, the operator can restart processing for an interrupted evaluation item from the timing of interruption by instructing the restart of statistical data sampling.

When the operator instructs sampling restart, the statistical evaluation system control means 103 detects the instruction (step 603 in FIG. 6) and sends control data instructing data sampling start to the statistical data sampling program executing means 104 (step 604).

The statistical data sampling program operation monitoring means 403 of the statistical data sampling program executing means 104 detects the control data instructing data sampling start (step 703 in FIG. 7) and issues control data instructing program activation (restart) to the statistical data sampling program generating/activating (restarting) means 405 (step 704).

The statistical data sampling program generating/activating (restarting) means 405 detects the control data directing program activation (restart) (step 805 in FIG. 8) and issues control data directing activation (restart) to the statistical data sampling program 406 (step 806).

The statistical data sampling program 406 detects the control data directing activation (restart) (NO in step A05 of FIG. 10) and continues the operation by using program restart information stored in the statistical result storage means 106 at the timing of interruption and necessary to restart the program next time. That is, the statistical data sampling program 406 keeps generating evaluation data, executing the evaluation object program, and collecting and storing data (steps A07, A08, and A09). The evaluation item restarted at that point is an evaluation item interrupted earliest.

In this embodiment as described above, it is possible to interrupt processing for an evaluation item currently being executed and process the next evaluation item. This function is convenient to interrupt processing for a certain evaluation item and preferentially process the next evaluation item, since collecting statistical data pertaining to one evaluation item takes a certain time. To make this function more practical, it is also possible to give the statistical data sampling program executing means 104 a function of calculating and displaying the current count and percentage of execution, execution count/sec, remaining time, and predicted value of the completion time, for an evaluation item currently being executed. With this function, the evaluation operator can obtain a certain standard indicating whether interruption is preferable.

FIG. 14 shows the status of execution of a statistical data sampling program displayed on the display device. Referring to FIG. 14, an operation is instructed from the keyboard, i.e., activation (restart) is instructed by inputting an encript command, and interruption is designated by pressing the [ESC] key. Also, when the operator presses the [SPACE] key, the current count and percentage of execution, execution count/sec, remaining time, and predicted value of the completion time are displayed for an evaluation item currently being executed. In FIG. 14, when the encript command is input an avalanche evaluation start message is displayed together with the present date and time. Since the [SPACE] key is pressed after that, the current count (percentage) of execution (execution count/sec), remaining time, and predicted value of the completion time are displayed for the avalanche evaluation item currently being executed. Subsequently, the [ESC] key is pressed, so a message indicating that the avalanche evaluation is interrupted, the intermediate results are saved, and a process of evaluating the input bit-output bit relation is started is displayed.

(3) Output of Statistical Data

When the operator designates a predetermined item such as an edit form and designates edit and output of Pi statistical data, the statistical evaluation system control means 103 detects this designation (step 605 in FIG. 6) and issues necessary control data to the statistical result edit/output means 105 (step 606). The numerical processing means 503 of the statistical result edit/output means 105 receives and analyzes the control data and performs necessary control.

For example, if the operator instructs to display the basic statistical amounts and sampled data of a certain evaluation item in the form of a table, the numerical processing means 503 reads out the statistical data of the evaluation item from the statistical result storage means 106. The numerical processing means 503 then calculates basic statistical amounts such as a mean, maximum, minimum, variance, and standard deviation and informs the table form numerical data edit/output means 505 of these calculated basic statistical amounts and the readout statistical data. The table form numerical data edit/output means 505 edits the informed statistical data into the form of a predetermined table and outputs the table together with the informed basic statistical amounts to the display device or printer. For example, Microsoft Excel 97 can be used to form a table.

FIG. 15 shows a table edited and output by using Microsoft Excel 97. In FIG. 15, a portion denoted by reference numeral 1501 is a table of statistical data indicating the correlations between individual bits of input and output data of an encryption device to be evaluated. This data is avalanche evaluation data. Numerals 0, 1, 2, ..., described in the row and column directions of this table indicate bits of one of input and output data and bits of the other data. A numerical value at each intersection indicates [count of inversion−count of non-inversion] of a specific output bit when a specific input bit is inverted. A portion denoted by reference numeral 1502 indicates basic statistical amounts, i.e., a mean, maximum, minimum, variance, standard deviation and 95% confidence interval are output. Note that "value", "xSD", "deviation", and "width" indicate the value, (value−mean)÷σ, deviation ratio, and width, respectively. In addition, the table describes random number seeds of key and input data, scheduled all data count, and finished all data count.

In the table of avalanche evaluation data shown in FIG. 15, a large positive numerical value indicates that the corresponding input and output bits have high correlation, and a large negative value indicates that the corresponding input bit does not contribute to scrambling the data, both of which means a bad property. If data scrambling is uneven as in this case, the algorithm may be decoded by attack using selective difference or the like; this algorithm is weak. On the other hand, a numerical value whose absolute value is small indicates that the probability of an output bit being inverted when the corresponding input bit is inverted is close to 0.5, so the scrambling performance is high. Accordingly, the larger the ratio of numerical values with small absolute values, the higher the encryption strength. Conventional statistical methods evaluate algorithms on the basis of basic statistical amounts. However, a mean value, for example, approaches 0 even if a large positive or negative numerical value exists, and this may cause an evaluation error. Additionally, the correlation between a specific input bit and a specific output bit cannot be checked, so the behavior of encryption conversion cannot be finely analyzed. In contrast, table form display allows fine analysis of the behavior of encryption conversion and makes accurate evaluation feasible. Furthermore, different encryption algorithms can be easily compared by comparing tables of different evaluation object programs. This applies to evaluation items such as an input bit-output bit relation as well as to avalanche evaluation.

Figure 16:
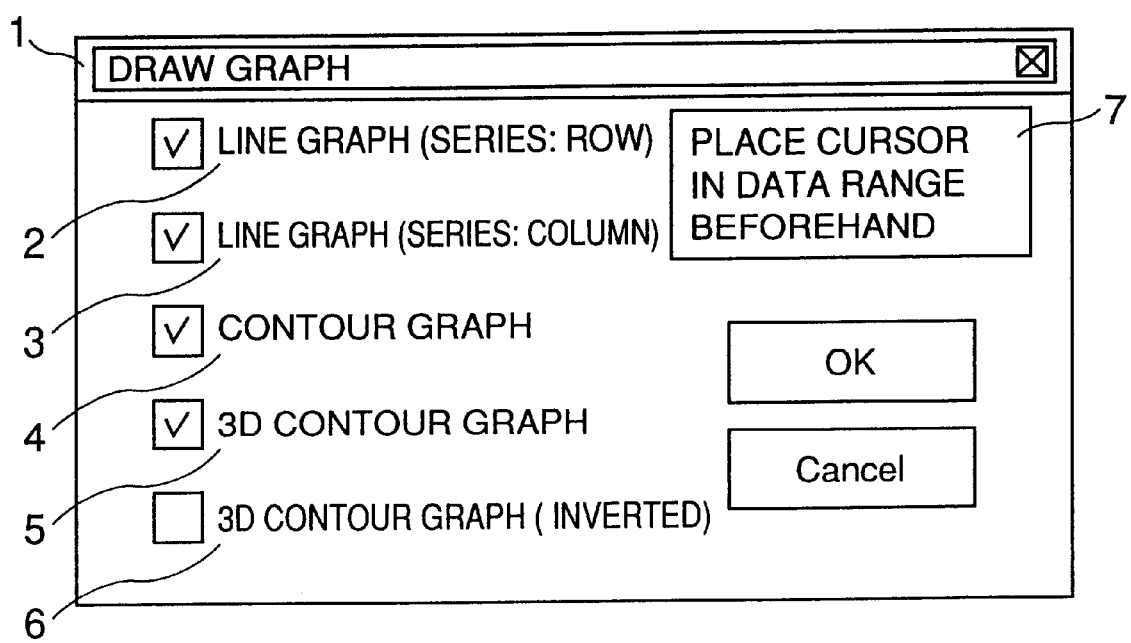
FIG. 16 is a view showing a "draw graph" dialogue box used to designate the type of graph.

In this embodiment, statistical data indicating the correlations between individual bits of input and output data of an encryption device can also be edited and output in the form of a two- or three-dimensional graph. Examples of the two-dimensional graph are a line graph and a contour graph, and an example of the three-dimensional graph is a 3D contour graph. The statistical evaluation system control means 103 displays, e.g., a "draw graph" dialogue box as shown in FIG. 16 on the screen of the display device to allow easy designation of the type of graph. Referring to FIG. 16, five types of graphs, i.e., a line graph (series: row), line graph (series: column), contour graph, 3D contour graph, and 3D contour graph (inverted) are prepared. The operator can easily designate the type of graph to be edited by selecting the OK button.

The statistical evaluation system control means 103 informs the statistical result edit/output means 105 of data indicating the type of graph designated by an operator. When the type of graph to be edited is designated for a certain evaluation item, the numerical processing means 105 reads out statistical data of the corresponding evaluation item and transfers the readout data to the multi-dimensional graph edit/output means 506 while designating the type of graph.

In accordance with the designated graph type, the multi-dimensional graph edit/output means 506 draws a graph of statistical data on a new graph sheet of, e.g., Microsoft Excel 97 and outputs the graph to the display device or printer.

FIGS. 17A to 17E show examples of different types of graphs. That is, FIGS. 17A, 17B, 17C, 17D, and 17E show a 3D contour graph, 3D contour graph (inverted), contour graph, line graph (series: row), and line graph (series: column), respectively.

Figure 17A:
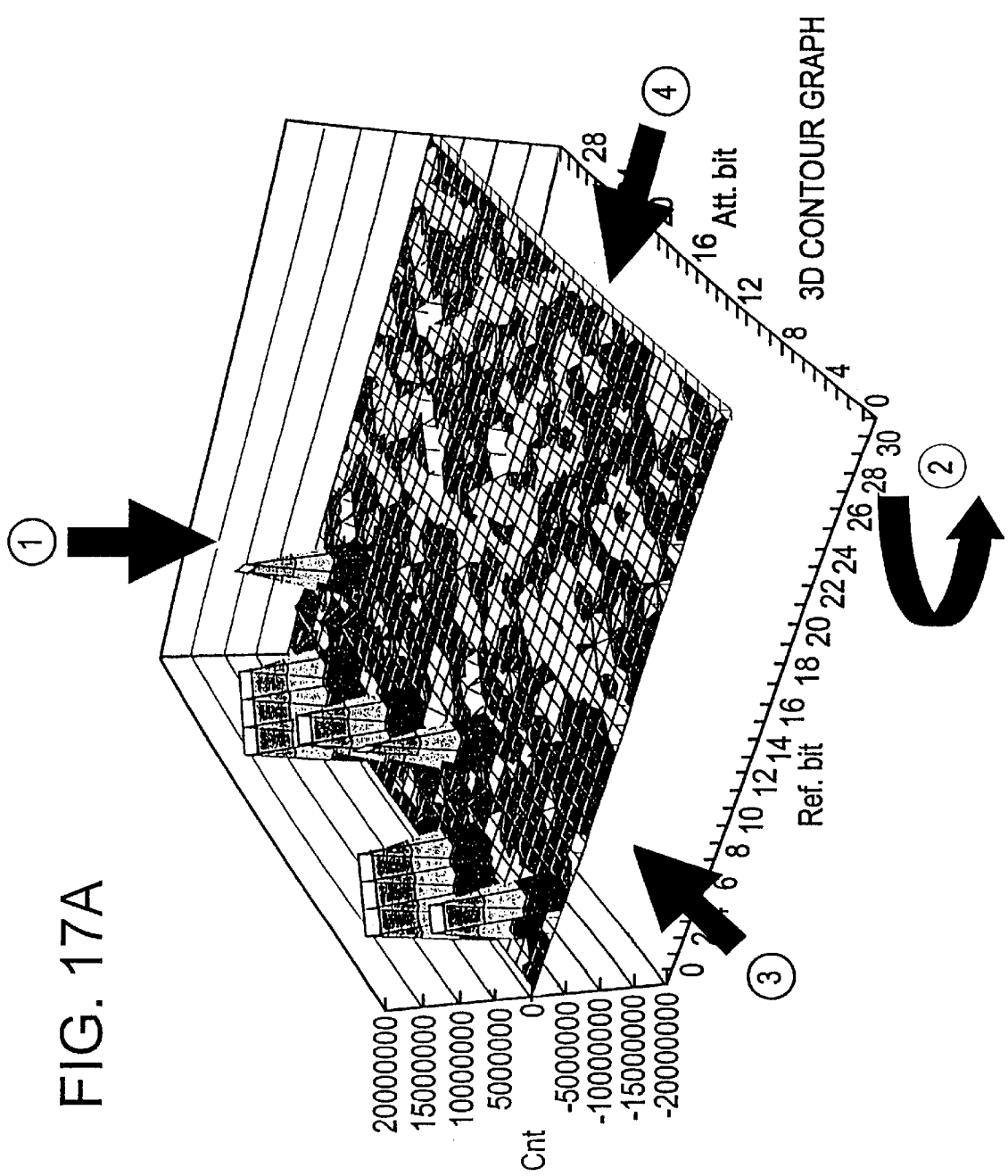
FIGS. 17A to 17E are views showing different types of graphs displayed when statistical data is edited and output.

The 3D contour graph shown in FIG. 17A draws the correlations between individual bits of input and output data as "mountains", "valleys", and "fields". In the case of avalanche evaluation data, for example, the input bit is plotted on the X axis, the output bit is plotted on the Y axis, and "count of inversion−count of non-inversion" is plotted on the Z axis. The graph is drawn such that the larger the value of [count of inversion−count of non-inversion] in the positive direction the higher the "mountains", the larger the value in the negative direction the deeper the "valleys", and the closer the value to 0 the closer the "mountains" and "valleys" to the "fields". Accordingly, a high mountain means that the corresponding input and output have a high correlation, and a deep valley means that the correlation is extremely low, both of which mean a bad property. On the other hand, a field indicates that the probability of an output bit being inverted when an input bit is inverted is close to 0.5, meaning a good property. A 3D contour graph like this allows the operator to intuitively, quickly, and thoroughly survey even details of the behavior of a whole encryption algorithm to be evaluated. The operator can also easily compare different encryption algorithms by comparing 3D contour graphs of a plurality of evaluation object programs.

Figure 17B:
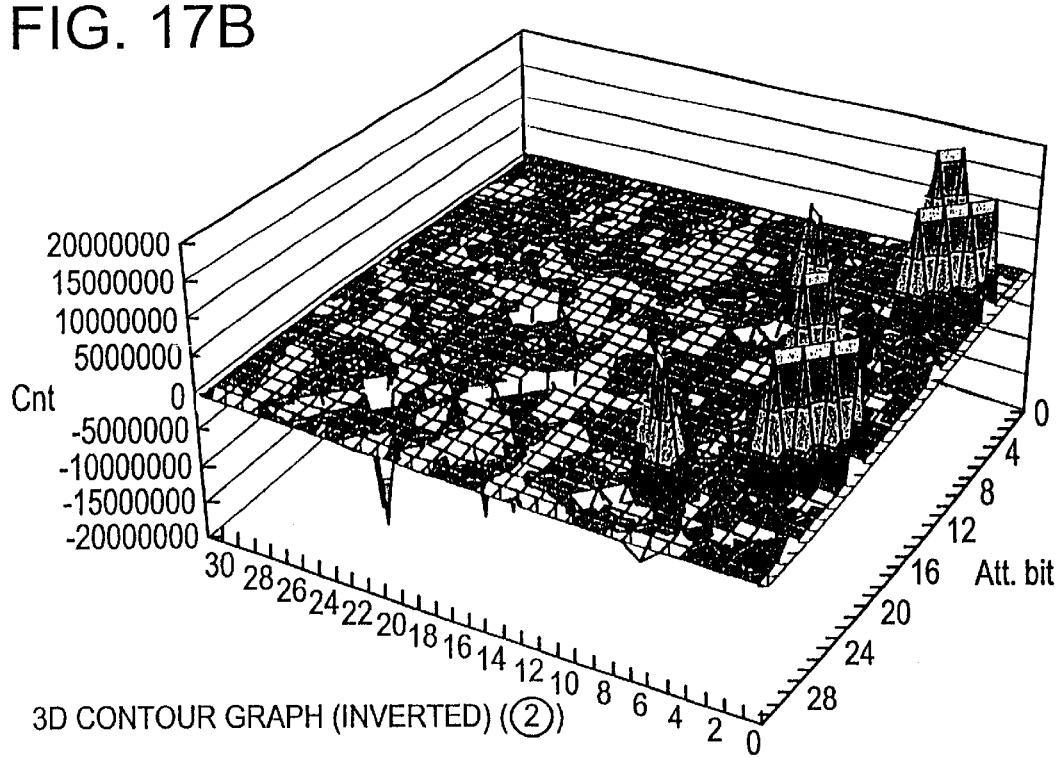
Figure 17C:
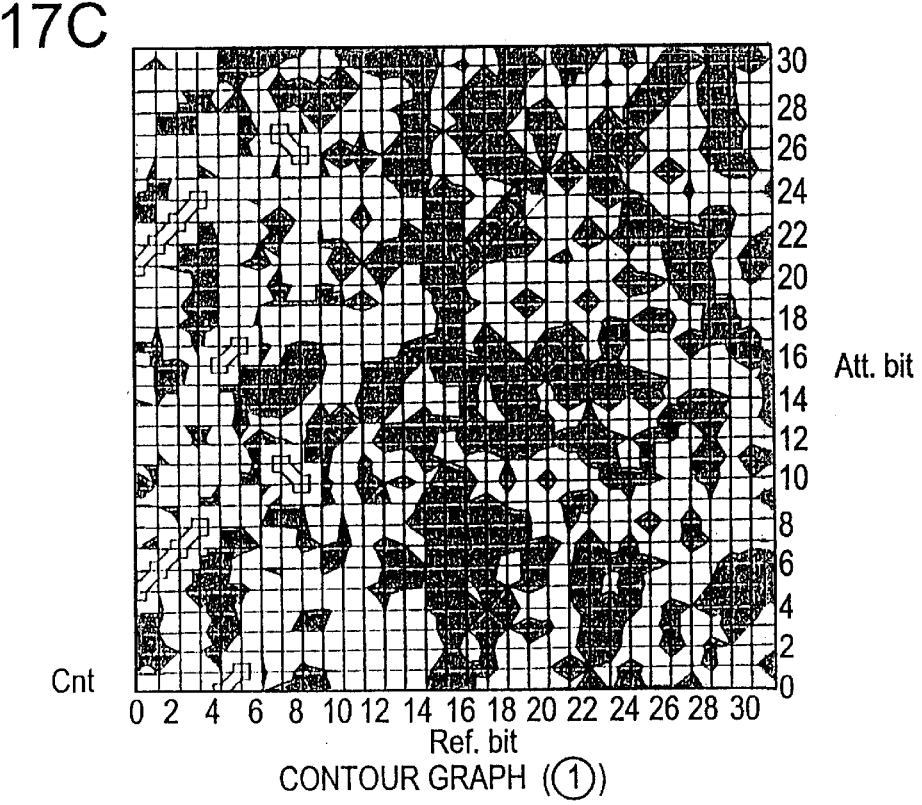
Figure 17D:
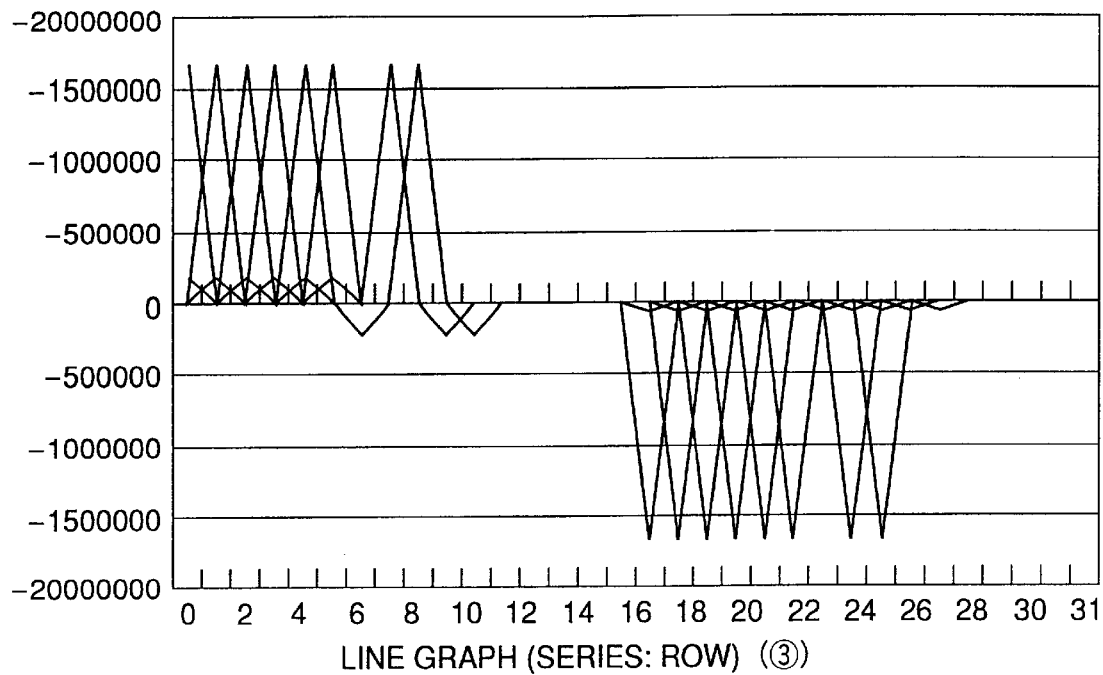
Figure 17E:
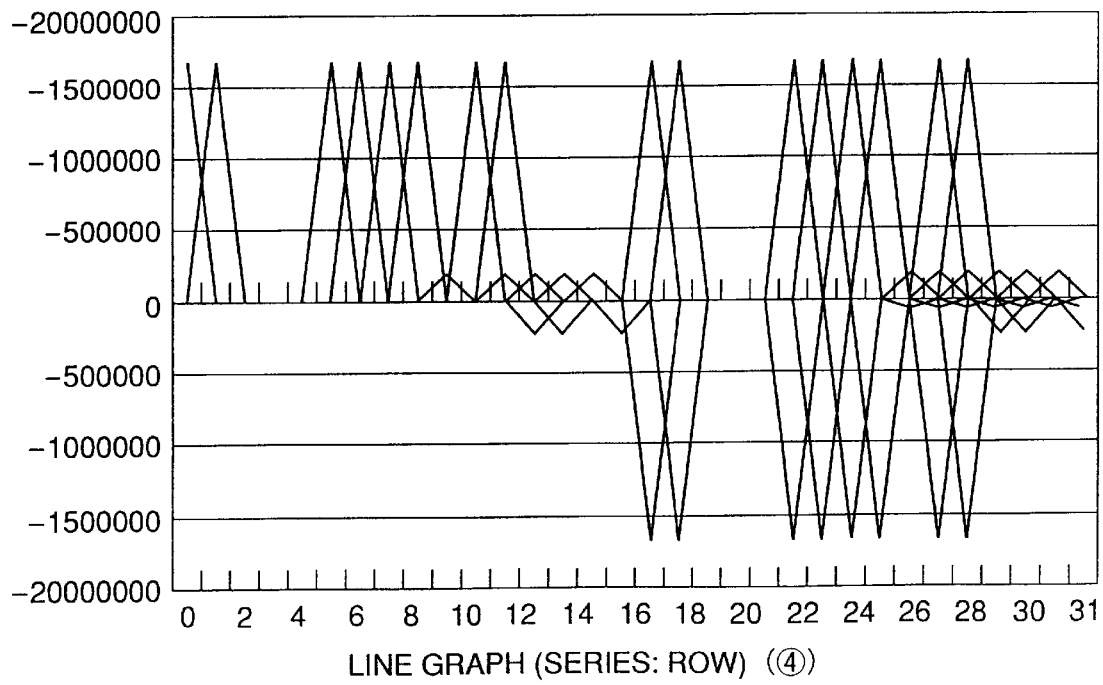

The 3D contour graph (inverted) shown in FIG. 17B is formed by inverting the mountains and valleys in the 3D contour graph shown in FIG. 17A. This graph allows the operator to observe the details of valleys that are difficult to see in a 3D contour graph. The contour graph shown in FIG. 17C shows the 3D contour graph in FIG. 17A when viewed in a direction ① in FIG. 17A. Referring to FIG. 17C, fields are drawn thinly, and mountains are drawn thickly. FIG. 17D is a graph showing a given section of the 3D contour graph in FIG. 17A when viewed in a direction ③ in FIG. 17A. FIG. 17E is a graph showing a given section of the 3D contour graph in FIG. 17A when viewed in a direction ④ in FIG. 17A. Each graph helps observe the 3D contour graph in more detail.

In this embodiment as described above, the correlations between individual bits of input and output data of an encryption device can be displayed as various graphs such as a 3D contour graph. Consequently, details of the behavior of encryption conversion can be finely and extremely easily analyzed. This allows accurate evaluation feasible.

(4) End

When the operator instructs end, the statistical evaluation system control means 103 detects this instruction (step 607 in FIG. 6). The statistical evaluation system control means 103 sends control data instructing end of the program operation to the statistical data sampling program executing means 104 and ends its own operation (step 608).

The statistical data sampling program operation monitoring means 403 of the statistical data sampling program executing means 106 detects the control data instructing end of the program operation (step 707 in FIG. 7), and issues control data instructing end of the program operation to the statistical data sampling program interrupting/ending means 404 and the statistical data sampling program generating/activating (restarting) means 405. If the statistical data sampling program 406 issues information, the statistical data sampling program operation monitoring means 403 ends its own operation (step 708).

The statistical data sampling program generating/activating (restarting) means 405 detects the control data directing end of the program operation (step 807 in FIG. 8) and ends its own operation (step 808). Also, the statistical data sampling program interrupting/ending means 404 detects the control data directing end of the program operation (step 905 in FIG. 9), issues control data directing the end to the statistical data sampling program 406 (step 906), and ends its own processing (step 908).

The statistical data sampling program 406 detects the control data instructing the end (YES in step A05 of FIG. 10), informs the statistical data sampling program operation monitoring means 403 of the end, and ends its own operation (step A06).

Figure 18:
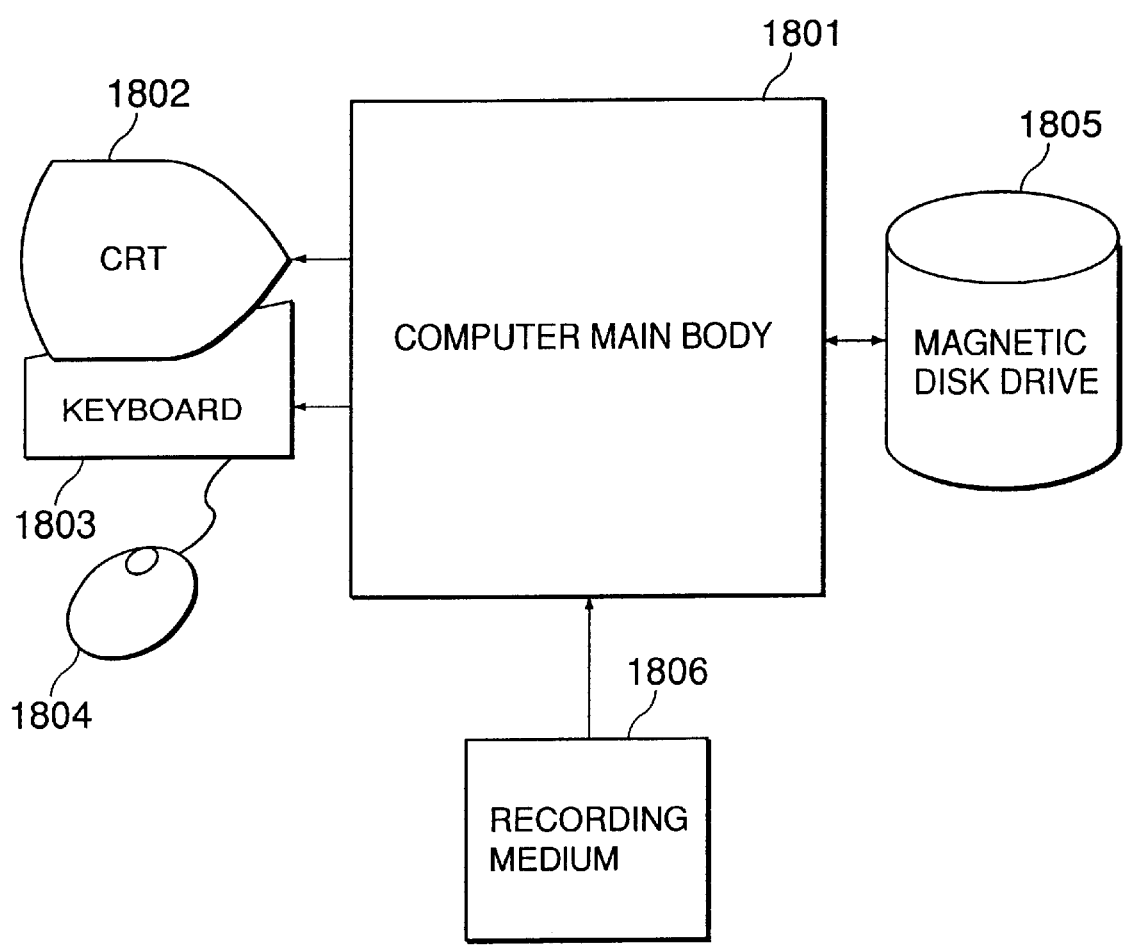
FIG. 18 is a block diagram showing the whole configuration of another embodiment of the present invention.

FIG. 18 is a block diagram showing the arrangement of another embodiment of the encryption strength evaluation support apparatus according to the present invention. The encryption strength evaluation support apparatus of this embodiment comprises a computer main body 1801 including, e.g., a central processing unit and a memory, and a CRT 1802, keyboard 1803, mouse 1804, magnetic disk drive 1805, and recording medium 1806 connected to this computer main body 1801. The recording medium 1806 is a mechanically readable recording medium such as a CD-ROM, magnetooptical disk, or semiconductor memory, and records an encryption strength evaluation support program. The encryption strength evaluation support program recorded in the recording medium 1806 is loaded into the computer main body 1801 to control the operation of the computer main body 1801. In this way the encryption strength evaluation support program implements an evaluation object data group generating means 101, a statistical program library generating means 102, a statistical evaluation system control means 103, a statistical data sampling program executing means 104, and a statistical result edit/output means 105 shown in FIGS. 1 to 5 on the computer main body 1801. Note that a statistical result storage means 106 shown in FIG. 1 is implemented by the magnetic disk drive 1805.

The embodiments of the present invention have been described above. However, the present invention is not limited to the above embodiments, and various additions and changes of the invention are possible. For example, if the encryption algorithm of an encryption device to be evaluated is unknown, it is also possible to calculate the correlation between each bit of input data and each bit of output data of the encryption device from data sequences of the input and output data. If this is the case, an evaluation object data group is formed by the data sequences of the input and output data of the encryption device, and each evaluation item data is sampled from these data sequences.

What is claimed is:

1. An encryption strength evaluation support apparatus characterized by comprising:

statistical data sampling program executing means for statistically obtaining correlations between individual bits of input and output data of an encryption device to be evaluated;

statistical result storage means for storing the bit correlations obtained by said statistical data sampling program executing means; and statistical result edit/output means for editing and outputting the bit correlations stored in said statistical result storage means in the form of a two-dimensional line graph or three-dimensional contour graph.

2. An apparatus according to claim 1, characterized by further comprising evaluation object program forming means for forming an encryption program to be evaluated, wherein said statistical data sampling program executing means statistically obtains correlations between individual bits of input and output data of the evaluation object program formed by said evaluation object program forming means.

3. An apparatus according to claim 1, characterized by further comprising:

statistical program library means for holding, for each predetermined evaluation item, a statistical program for calculating data necessary to evaluate the evaluation item; and evaluation object data group generating means having evaluation object program forming means for forming an encryption program to be evaluated, evaluation condition setting means for setting evaluation conditions, and interface function setting means for setting an interface between the evaluation object program formed by said evaluation object program forming means and the statistical programs, said evaluation object data group generating means holding an evaluation object data group including the formed evaluation object program and the set evaluation conditions and interface, wherein said statistical data sampling program executing means comprises statistical data sampling program generating/activating (restarting) means for generating a statistical data sampling program for statistically obtaining correlations between individual bits of input and output data of the evaluation object program from the evaluation object data group and the statistical programs in said statistical program library means.

4. An apparatus according to claim 3, characterized in that said statistical program library means comprises a basic function library of basic functions such as addition, subtraction, and logical operations, and statistical program library generating means for generating a statistical program to be added to a statistical program library by using the basic functions of said basic function library.

5. An apparatus according to claim 1, characterized in that said statistical data sampling program executing means comprises means for sequentially collecting statistical data for a plurality of evaluation items.

6. An apparatus according to claim 5, characterized in that said statistical data sampling program executing means has a function of interrupting processing for an evaluation item currently being executed and processing the next evaluation item in accordance with an instruction from a user.

7. An apparatus according to claim 6, characterized in that said statistical data sampling program executing means has a function of restarting processing for an evaluation item interrupted in accordance with an instruction from a user.

8. A mechanically readable recording medium recording an encryption strength evaluation support program which allows a computer to function as:

statistical data sampling program executing means for statistically obtaining correlations between individual bits of input and output data of an encryption device to be evaluated;

statistical result storage means for storing the bit correlations obtained by said statistical data sampling program executing means; and statistical result edit/output means for editing and outputting the bit correlations stored in said statistical result storage means in the form of a two-dimensional line graph or three-dimensional contour graph.

9. An apparatus according to claim 2, characterized in that said statistical data sampling program executing means comprises means for sequentially collecting statistical data for a plurality of evaluation items.

10. An apparatus according to claim 3, characterized in that said statistical data sampling program executing means comprises means for sequentially collecting statistical data for a plurality of evaluation items.

11. An apparatus according to claim 4, characterized in that said statistical data sampling program executing means comprises means for sequentially collecting statistical data for a plurality of evaluation items.

12. An apparatus according to claim 9, characterized in that said statistical data sampling program executing means has a function of interrupting processing for an evaluation item currently being executed and processing the next evaluation item in accordance with an instruction from a user.

13. An apparatus according to claim 10, characterized in that said statistical data sampling program executing means has a function of interrupting processing for an evaluation item currently being executed and processing the next evaluation item in accordance with an instruction from a user.

14. An apparatus according to claim 11, characterized in that said statistical data sampling program executing means has a function of interrupting processing for an evaluation item currently being executed and processing the next evaluation item in accordance with an instruction from a user.

15. An apparatus according to claim 12, characterized in that said statistical data sampling program executing means has a function of restarting processing for an evaluation item interrupted in accordance with an instruction from a user.

16. An apparatus according to claim 13, characterized in that said statistical data sampling program executing means has a function of restarting processing for an evaluation item interrupted in accordance with an instruction from a user.

17. An apparatus according to claim 14, characterized in that said statistical data sampling program executing means has a function of restarting processing for an evaluation item interrupted in accordance with an instruction from a user.

* * * * *